US012808109B2

(12) United States Patent
Alarcon et al.

(10) Patent No.: US 12,808,109 B2
(45) Date of Patent: Nov. 24, 2026

(54) LIFTER FOR A LAUNDRY APPLIANCE THAT INCLUDES AN INTERNAL FILTER FOR REMOVING PET HAIR FROM LAUNDRY BEING PROCESSED

(71) Applicant: WHIRLPOOL CORPORATION, Benton Harbor, MI (US)

(72) Inventors: Luis Antonio Alarcon, Monterrey (MX); Charles J. Guidarini, St. Joseph, MI (US); Andrew C. Kubasiak, St. Joseph, MI (US); Sergio Moreno, Apodaca (MX); John Jay Myers, Saugatuck, MI (US); Kiran D. Nakil, Latur (IN); Tarun Sai Yadav Godha, St. Joseph, MI (US); B. Shiva, Hyderabad (IN); Nicholas Leep, Saint Joseph, MI (US); Stefano Turchi, Falconara Marittima (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 420 days.

(21) Appl. No.: 18/511,497

(22) Filed: Nov. 16, 2023

(65) Prior Publication Data

US 2024/0084491 A1 Mar. 14, 2024

Related U.S. Application Data

(63) Continuation-in-part of application No. 18/326,694, filed on May 31, 2023.

(Continued)

(51) Int. Cl.
*D06F 37/06* (2006.01)
*B01D 29/03* (2006.01)
(Continued)

(52) U.S. Cl.
CPC ........... *D06F 37/065* (2013.01); *B01D 29/03* (2013.01); *B01D 29/96* (2013.01); *B01D 35/30* (2013.01);
(Continued)

(58) Field of Classification Search
CPC .. D06F 37/065; D06F 39/10; B01D 2201/305
See application file for complete search history.

(56) References Cited

U.S. PATENT DOCUMENTS 3,314,253 A 4/1967 Smith
4,338,802 A 7/1982 Ohmann et al.
(Continued)

FOREIGN PATENT DOCUMENTS

CN 106167975 A 11/2016
CN 109402952 A * 3/2019 ........... D06F 37/065
(Continued)

*Primary Examiner* — Ryan B Huang
*Assistant Examiner* — Adam Adrien Germain
(74) *Attorney, Agent, or Firm* — BROOKS KUSHMAN P.C.

(57) ABSTRACT

A filter element for a removable filter apparatus of a laundry treating appliance includes a rectangular base and a filtration surface, integral to the rectangular base, defining a particulate capture chamber extending upwards from the rectangular base, the particulate capture chamber being centered along a midpoint of the rectangular base along the length of the filter element, the particulate capture chamber having an open bottom through the rectangular base.

20 Claims, 20 Drawing Sheets

Related U.S. Application Data

(60) Provisional application No. 63/355,839, filed on Jun. 27, 2022.

(51) Int. Cl.
*B01D 29/96* (2006.01)
*B01D 35/30* (2006.01)
*D06F 39/10* (2006.01)

(52) U.S. Cl.
CPC ........ *D06F 39/10* (2013.01); *B01D 2201/305* (2013.01)

(56) References Cited

U.S. PATENT DOCUMENTS

| | | | | |
|---|---|---|---|---|
| 7,392,672 | B2 | 7/2008 | Kim et al. | |
| 7,827,830 | B2 | 11/2010 | Kim | |
| 7,836,733 | B2 * | 11/2010 | Bae | D06F 39/10 68/18 F |
| 10,253,446 | B2 | 4/2019 | Lv et al. | |
| 10,920,359 | B2 | 2/2021 | Piekarski et al. | |
| 11,149,377 | B2 | 10/2021 | Lee et al. | |
| 2008/0282747 | A1 | 11/2008 | Kim | |
| 2013/0081432 | A1 * | 4/2013 | Choi | D06F 37/14 68/142 |
| 2013/0213095 | A1 * | 8/2013 | Monacchi | D06F 39/10 68/12.13 |
| 2018/0171532 | A1 | 6/2018 | Cheng et al. | |
| 2020/0248364 | A1 | 8/2020 | Lee et al. | |
| 2022/0220657 | A1 | 7/2022 | Bauer et al. | |
| 2022/0243384 | A1 * | 8/2022 | Jung | B01D 29/05 |

FOREIGN PATENT DOCUMENTS

| | | | | | |
|---|---|---|---|---|---|
| CN | 108193444 | B | | 5/2020 | |
| CN | 112430988 | B | | 11/2021 | |
| EP | 2385166 | A1 | * | 11/2011 | D06F 39/10 |
| JP | 2004089339 | A | * | 3/2004 | D06F 39/10 |
| JP | 3817502 | B2 | | 9/2006 | |
| JP | 2011078483 | A | * | 4/2011 | |
| KR | 100335053 | B1 | | 5/2002 | |
| KR | 100392394 | B1 | | 7/2003 | |
| KR | 20060122256 | A | * | 11/2006 | D06F 39/125 |
| KR | 20190012354 | A | * | 2/2019 | D06F 37/06 |
| KR | 1020190012354 | A | | 2/2019 | |
| WO | 2008140169 | A1 | | 11/2008 | |
| WO | 2020052180 | A1 | | 3/2020 | |

* cited by examiner

LIFTER FOR A LAUNDRY APPLIANCE THAT INCLUDES AN INTERNAL FILTER FOR REMOVING PET HAIR FROM LAUNDRY BEING PROCESSED

CROSS-REFERENCE TO RELATED APPLICATIONS

This application is a continuation-in-part of U.S. application Ser. No. 18/326,694 filed May 31, 2023, which in turn claims the benefit of U.S. provisional application Ser. No. 63/355,839 filed Jun. 27, 2022, the disclosures of which are hereby incorporated in their entireties by reference herein.

TECHNICAL FIELD

The present disclosure generally relates to laundry appliances, and more specifically, to laundry appliances that include lifters disposed within a rotating drum, where the lifters include a removable filtering mechanism for separating particulate matter from loads of laundry being processed within the drum.

BACKGROUND

Laundry treating appliances, such as clothes washers, clothes dryers, and refreshers, may have a rotating drum that defines a treating chamber in which laundry items are placed for treatment. The drum may be disposed within the interior of a cabinet between opposing front rear bulkheads.

SUMMARY

In one or more illustrative examples, a removable filter apparatus for a laundry treating appliance includes a lifter cover defining a generally trapezoidal prism shape with an open rectangular bottom. The lifter cover is configured to be slidably attachable along the rectangular bottom to a lifter base attached to an inner circumferential surface of a drum of the laundry treating appliance. The lifter cover defines through openings to allow for free flow of water. The apparatus further includes a filter element attachable to the lifter cover and sized to fit within the lifter cover to allow the filter element to capture particulate within the water flow.

In one or more illustrative examples, a laundry treating appliance having a removable filter apparatus includes a lifter base attached to an inner circumferential surface of a drum of the laundry treating appliance; a lifter cover, defining a generally trapezoidal prism shape with an open rectangular bottom and configured to be selectively attachable to the lifter base along the rectangular bottom, the lifter cover defining through openings to allow for free flow of water; and a filter element, hingedly attachable to the lifter cover by a snap-on hinge assembly, the filter element being sized to fit within the lifter cover when the lifter cover is attached to the lifter base to allow the filter element to capture particulate within the water flow.

In one or more illustrative examples, a lifter cover for a removable filter apparatus includes a squeeze latch molded into the lifter cover, the squeeze latch defining latch arms having snaps that ride bosses of a lifter base to flex toward one another as the lifter cover is slid onto the lifter base and then resiliently flex back toward their original position once the snaps pass beyond the bosses, the latch arms being squeezable together to release the squeeze latch and allow the snaps to pass between the bosses as the lifter cover is slid off the lifter base, a series of stops onto which a filter element rests inside the lifter cover in a closed position, wherein the stops collectively serve to limit movement of the filter element into the lifter cover, and one or more filter latches to secure the filter element into the lifter cover, the stops and the filter latches being spaced apart and arranged to define a gap into which the filter element snaps into place.

In one or more illustrative examples, a filter element for a removable filter apparatus of a laundry treating appliance includes a rectangular base and a filtration surface, integral to the rectangular base, defining a particulate capture chamber extending upwards from the rectangular base, the particulate capture chamber being centered along a midpoint of the rectangular base along the length of the filter element, the particulate capture chamber having an open bottom through the rectangular base.

In one or more illustrative examples, a removable filter apparatus for a laundry treating appliance includes a lifter cover, defining a generally trapezoidal prism shape with an open rectangular bottom, the lifter cover being selectively attachable along the open rectangular bottom to a lifter base of an inner circumferential surface of a drum of the laundry treating appliance, the lifter cover defining through openings to allow for free flow of water. The removable filter apparatus also includes a filter element, selectively attachable to the lifter cover, the filter element sized to fit within the lifter cover to allow the filter element to capture particulate within the water flow, the filter element defining a rectangular base, and a filtration surface, integral to the rectangular base, defining a particulate capture chamber extending upwards from the rectangular base, the particulate capture chamber being centered along a midpoint of the rectangular base along the length of the filter element, the particulate capture chamber having an open bottom through the rectangular base.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

The components in the figures are not necessarily to scale, emphasis instead being placed upon illustrating the principles described herein.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A filter for a laundry appliance may include a lifter base, a removable lifter cover, and a removable internal filter element that fits within the lifter cover. The lifter cover may be slidably attached to a plurality of engaging hooks (e.g., eight) of the lifter base to provide structure for retention of the lifter cover onto the lifter base. The lifter cover may define a squeeze latch feature for securely fixing the cover to the lifter base. The filter element may be attached to a side of the lifter cover by a hinge, such that the filter element may be rotated open to allow access for cleaning. A filter latch may be provided on the opposite side of the cover to secure the filter element in place inside the lifter cover. When engaged, the filter latch may prevent the filter element from swinging open while the lifter cover is being manipulated by an operator. The bottom side of the filter element may define a finger relief or other pull to ease unlatching of the filter element from the lifter cover.

Figure 1:
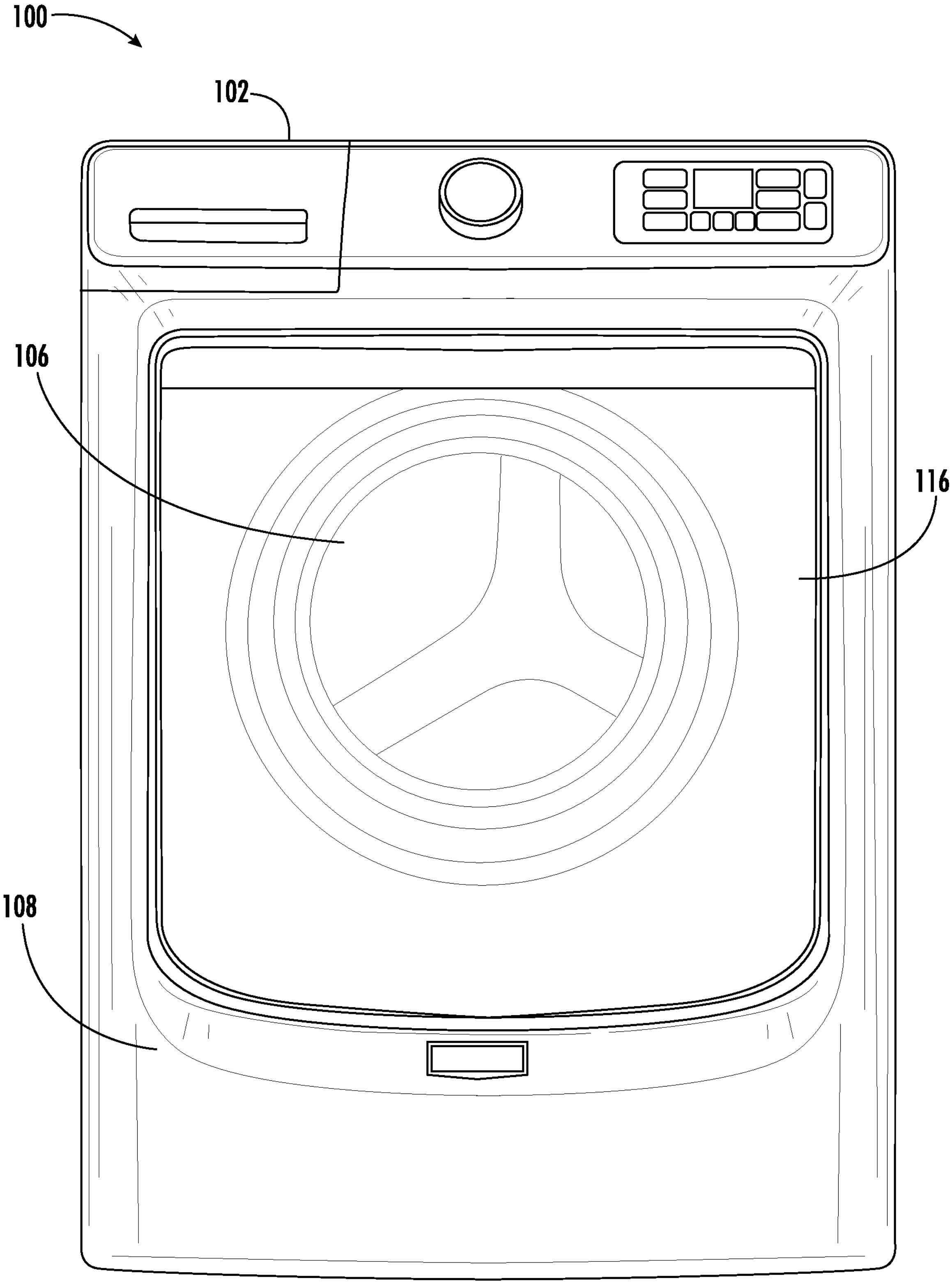
FIG. 1 illustrates a front view of a clothes dryer, in accordance with one or more embodiments of the disclosure.

FIG. 1 is a view of a laundry treating appliance 100 configured to utilize a removable filter apparatus 200. The laundry treating appliance 100 may be any machine that treats articles such as clothing or fabrics. Examples of the laundry treating appliance 100 may include, but are not limited to, a horizontal axis washing machine; a horizontal axis dryer (such as a tumble dryer or a stationary dryer), a tumbling or stationary refreshing/revitalizing machine, an extractor, a non-aqueous washing apparatus, and a revitalizing machine. As used herein, the term "horizontal-axis" washing machine refers to a washing machine having a rotatable drum that rotates about a generally horizontal axis relative to a surface that supports the washing machine. However, the rotational axis need not be perfectly horizontal to the surface. For example, the drum may rotate about an axis inclined relative to the horizontal axis (e.g., with fifteen degrees of inclination being one example of the inclination).

As illustrated in FIG. 1, the laundry treating appliance 100 may include a cabinet 102. The cabinet 102 may be defined by a chassis or frame supporting a front wall 108, as well as a rear wall, and a pair of side walls supporting a top wall (not shown). The cabinet 102 may house a stationary tub (not shown). A rotatable drum 106 may be mounted within the tub (not shown) to define a fabric treatment chamber. The drum 106 may define a plurality of perforations 118 to allow wash fluid 109 to flow between the tub and the drum 106 through the perforations 118. The wash fluid 109 may include water, detergent, etc. A motor may be coupled to the drum 106 through a belt to rotate the drum 106. Both the tub and the drum 106 may be selectively closed by a door 116. The door 116 may be hingedly mounted to the front wall 108 and may be selectively moveable between opened and closed positions to close an opening in the front wall 108, which provides access to the interior of the rotatable drum 106. In the open position, a user can access a processing space 120 defined within the drum 106 for manipulating the removable filter apparatus 200 contained therein.

Figure 2A:
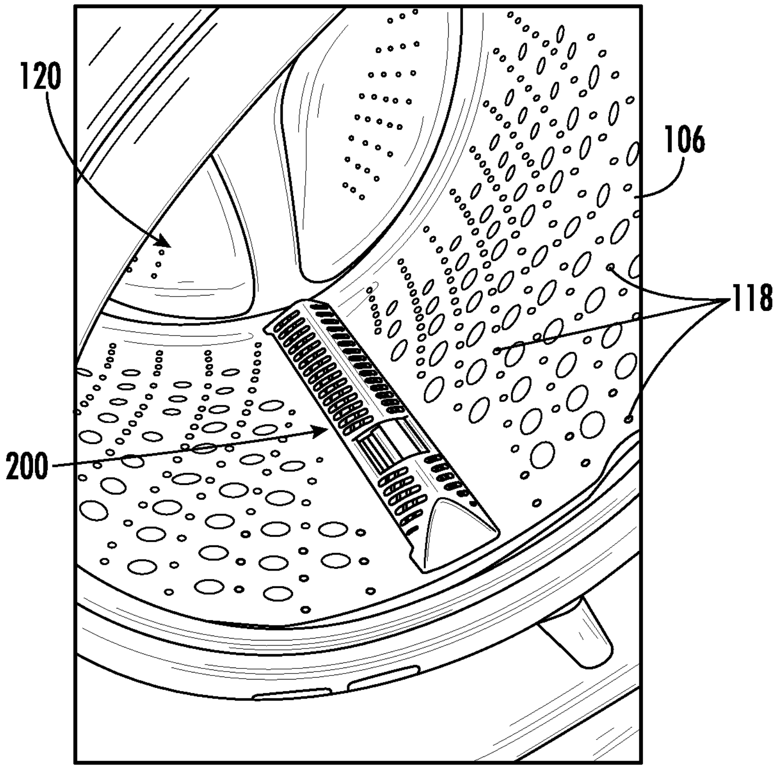
FIG. 2A illustrates an interior view of the drum of the clothes dryer of FIG. 1, with the removable filter apparatus in an installed state.

FIG. 2A illustrates an interior view of the drum 106 of the laundry treating appliance 100 of FIG. 1, with a removable filter apparatus 200 in an installed state. As explained in detail herein, the inner peripheral surface of the drum 106 may provide for the installation of one or more removable filter apparatus 200. The removable filter apparatus 200 may function as a lifter so as to help clothes or other laundry items to move around the drum 106 as the drum 106 rotates during a laundry cycle. The removable filter apparatus 200 may also be utilized to capture lint, hair, or other particulate during operation of the laundry treating appliance 100.

Figure 2B:
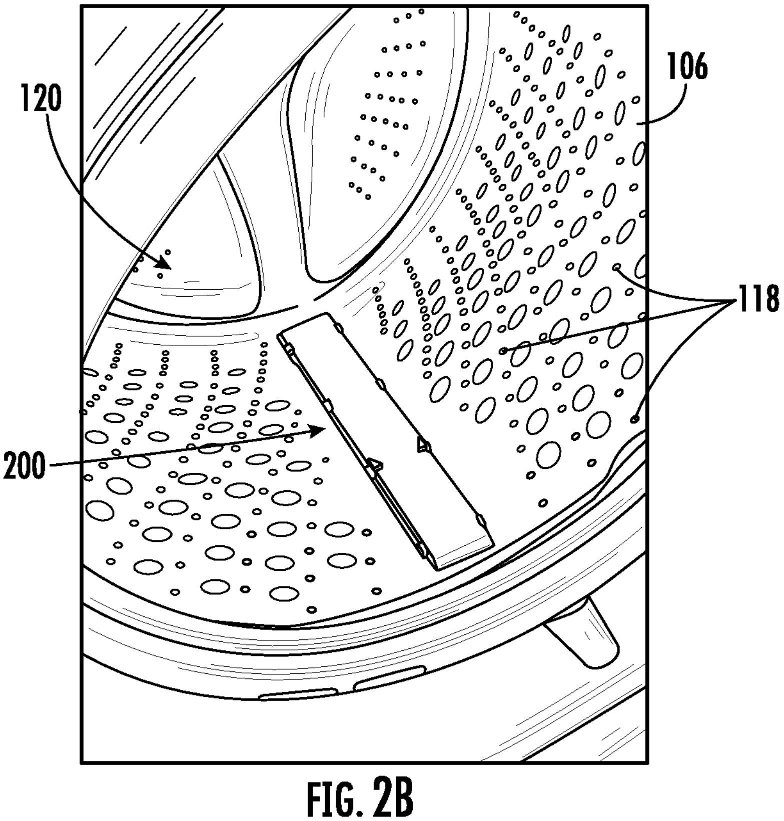
FIG. 2B illustrates an interior view of the drum of the clothes dryer of FIG. 1, with the removable filter apparatus in an uninstalled state.

FIG. 2B illustrates an interior view of the drum 106 of the clothes dryer of FIG. 1, with the removable filter apparatus 200 in an uninstalled state. In such a state, the lifter base 302 may be seen embedded in the wall of the drum 106, without attachment of the lifter cover 304.

While only a single removable filter apparatus 200 is shown in FIGS. 2A-2B, there may be multiple such removable filter apparatus 200 arranged around the inner peripheral surface of the drum 106. For example, there may be three, four, or five removable filter apparatus 200 arranged within the drum 106. While removed, the removable filter apparatus 200 may be cleaned and such captured lint, hair, etc., may be cleared from the removable filter apparatus 200.

Figure 3:
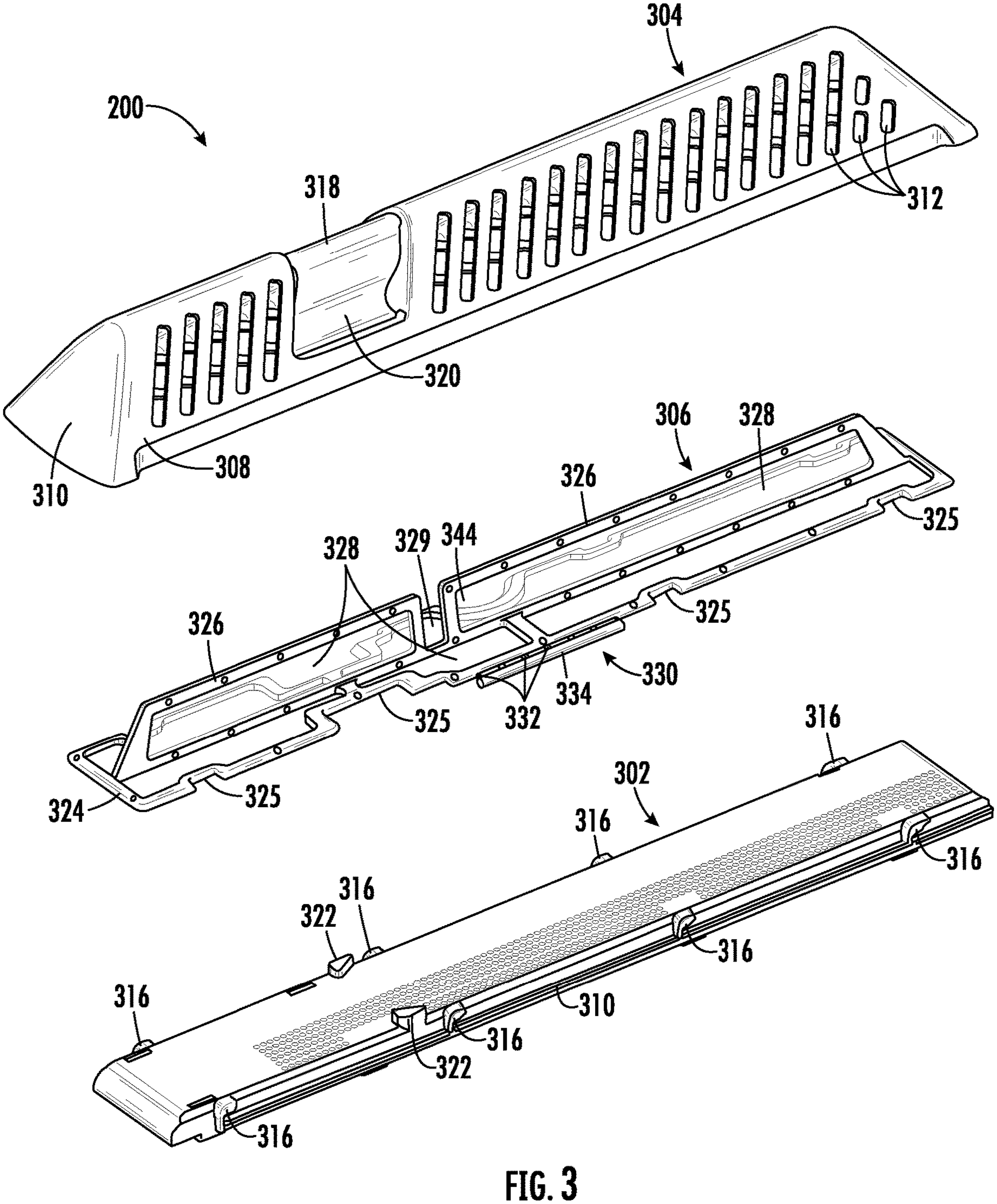
FIG. 3 illustrates an exploded isometric view of the components of the removable filter apparatus, in accordance with one or more embodiments.

FIG. 3 illustrates an exploded isometric view of the components of the removable filter apparatus 200. As shown, the components of the removable filter apparatus 200 include a lifter base 302, a lifter cover 304, and a filter element 306. The lifter base 302 may be fixed to the drum 106 and may define a generally rectangular surface configured for receiving the lifter cover 304. The lifter cover 304 may define the exterior appearance of the removable filter apparatus 200, and may be configured to be removably attached to the lifter base 302. The filter element 306 may be sized to fit within the lifter cover 304 when the lifter cover 304 is attached to the lifter base 302.

Figure 4:
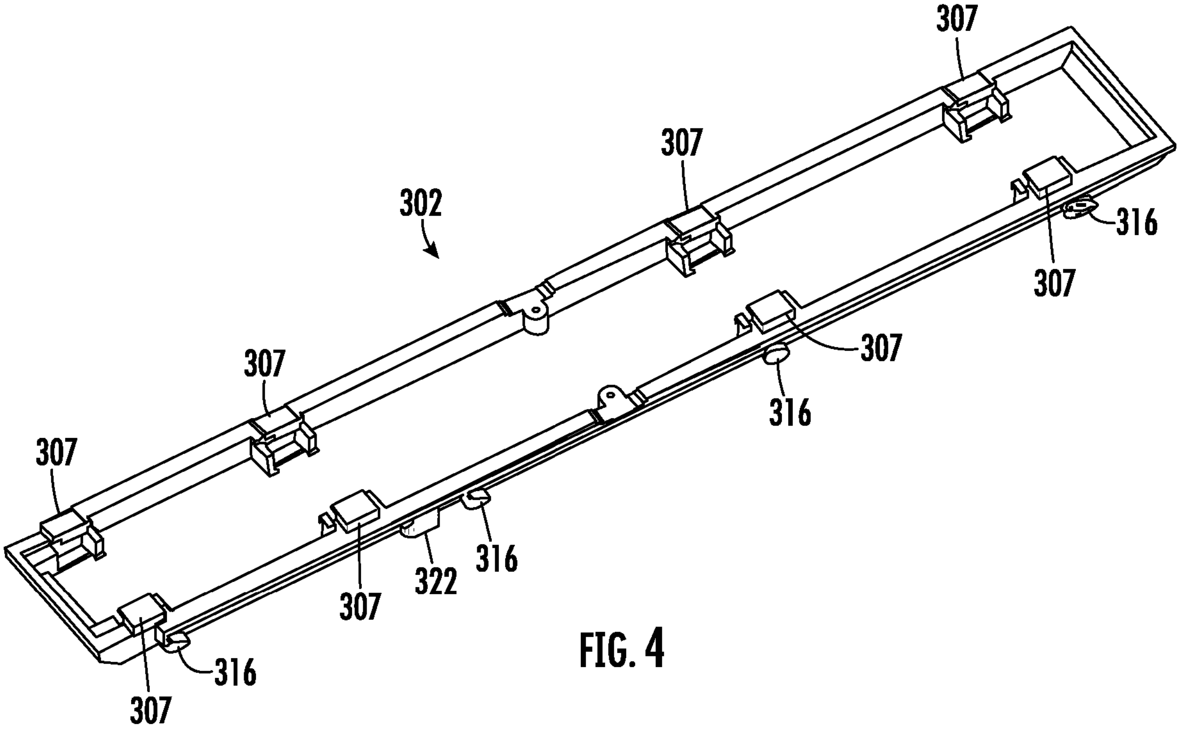
FIG. 4 illustrates an isometric view of the underside of the lifter base, in accordance with one or more embodiments.

FIG. 4 illustrates an isometric view of the underside of the lifter base 302. As shown, the lifter base 302 may include various features to facilitate attachment of the lifter base 302 to the drum 106. In an example, the lifter base 302 may define one or more attachment mechanisms, specifically referred to as snaps fasteners 307 herein, to be received into corresponding components of the interior of the drum 106 (not shown). In other examples of attachment mechanisms, the lifter base 302 may be fixed to the drum 106 by way of screws, pins, rivets, and/or glue. In yet a further example (not shown), the lifter base 302 may be integral to the drum 106. In some examples, the attachment features of the lifter base 302 may be consistent with those of a single-piece non-removable lifter, to allow for seamless installation or retrofit of the removable filter apparatus 200 into laundry treating appliances 100 with traditional fixed lifters.

Referring back to FIG. 3, the lifter cover 304 may define a generally trapezoidal prism shape with an open rectangular bottom 303. This open lower section 305 of the lifter cover 304 allows wash fluid 109 to pass through the filter cavity 315 by moving through the perforations 118 of the drum 106. As shown, the lifter cover 304 defines two generally trapezoidal longitudinal walls 308 of a generally consistent thickness along the longitudinal direction of the lifter cover 304, and two generally triangular end caps 310 at either end of the lifter cover 304 that connect between the longitudinal walls 308 and the open rectangular bottom 303. The end caps 310 may taper inward towards the apex of the lifter cover 304, such that the length of the lifter cover 304 at the apex is less than the length of the lifter cover 304 at the rectangular bottom. In many examples, the lifter cover 304 may be formed as a single plastic body. In other examples, the lifter cover 304 may be composed, at least in part, of a nylon mesh overmolded to another structure to impart strength to the overall lifter cover 304. Additionally or alternatively, the lifter cover 304 may include one or more lateral ribs 311 connecting between the longitudinal walls 308 to add rigidity to the structure of the lifter cover 304.

The longitudinal walls 308 of the lifter cover 304 may define various through openings 312 to allow for the free flow of water into and out of the lifter cover 304. Accordingly, whether the drum 106 is rotating in a clockwise direction and/or a counter clockwise direction, wash fluid 109 is permitted to pass through the inner volume of the lifter cover 304, such as during an agitating portion of a wash cycle. As shown, the through openings 312 are formed as a series of equally-spaced slots along the face of the longitudinal walls 308, parallel to one of the triangular end caps 310. The openings 312 in the illustrated example include support ribs dividing each slot into thirds, which may provide rigidity and prevent laundry articles from entering the lifter cover 304, but still allowing for smaller particles to enter the lifter cover 304. It should be noted that the specific pattern of through openings 312 and ribs is exemplary and other patterns may be contemplated.

The lifter cover 304 further defines features to facilitate attachment of the lifter cover 304 onto the lifter base 302. These features allow the lifter cover 304 to be secured to the lifter base 302 during machine operation. As shown, the lifter base 302 defines guide rails 314 extending outward from its sidewalls along the length of the lifter base 302, as well as a plurality of engaging hooks 316 extending longitudinally above the guide rails 314. When attached to the lifter base 302, the combination of the lifter base 302 and the lifter cover 304 may define an inner volume. This inner volume can also be described as a filter cavity 315 that is contained within the removable filter apparatus 200 for use within the drum 106.

Figure 5:
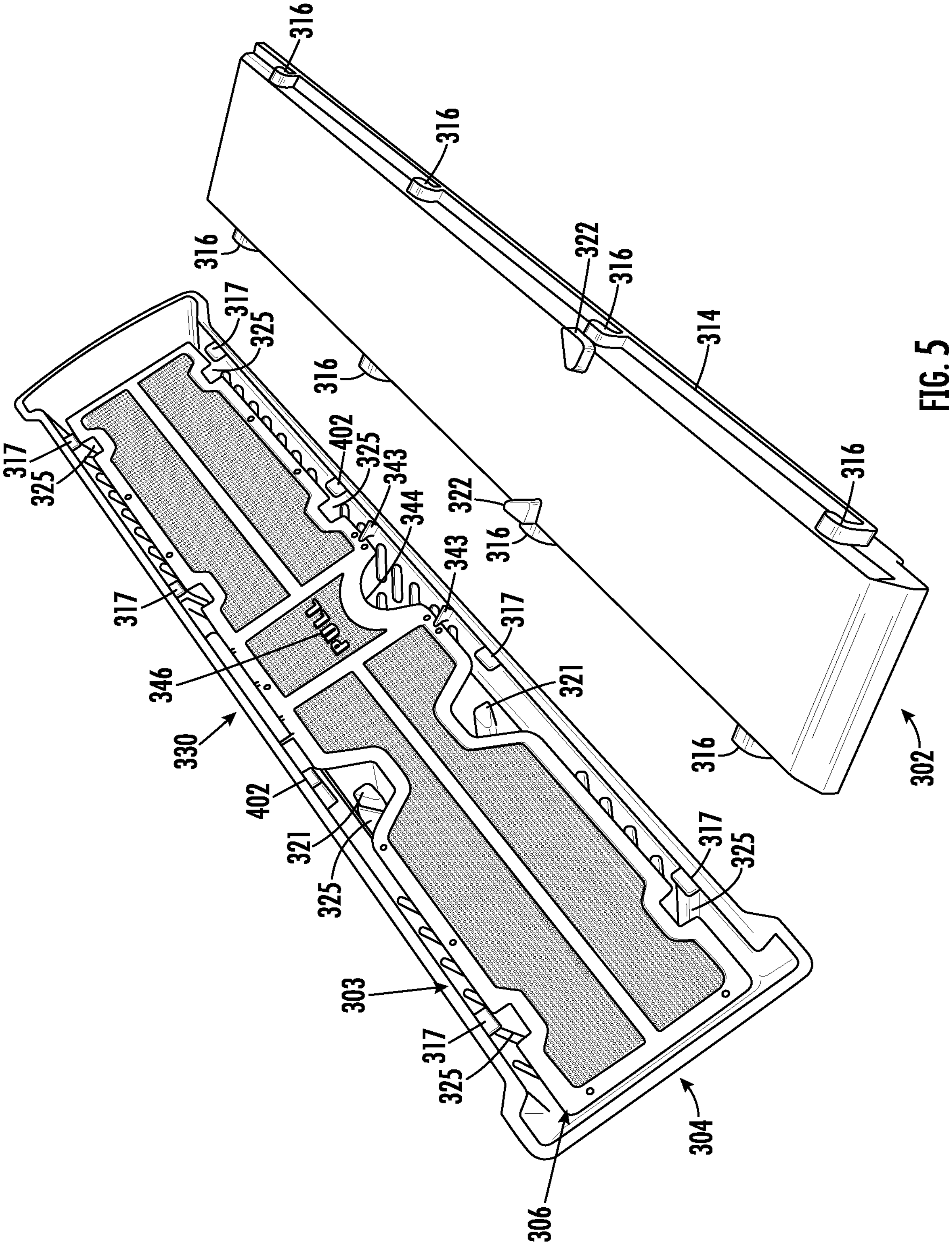
FIG. 5 illustrates an isometric view of the underside of the lifter cover with the filter element attached to the lifter cover in the closed position, as well as the upper face of the lifter base, in accordance with one or more embodiments.
Figure 6:
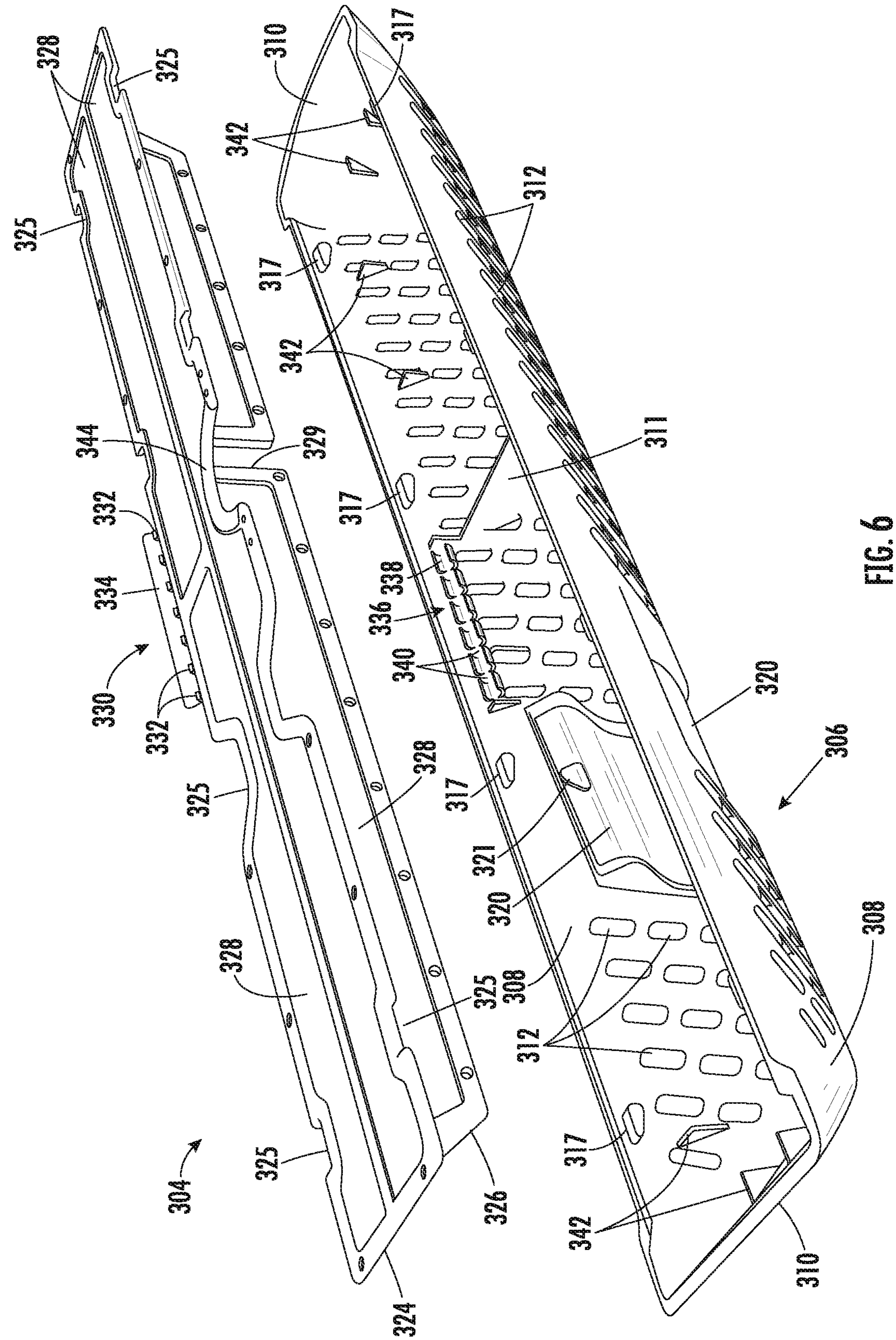
FIG. 6 illustrates an isometric view of the filter element detached from the lifter cover, in accordance with one or more embodiments.
Figure 7:
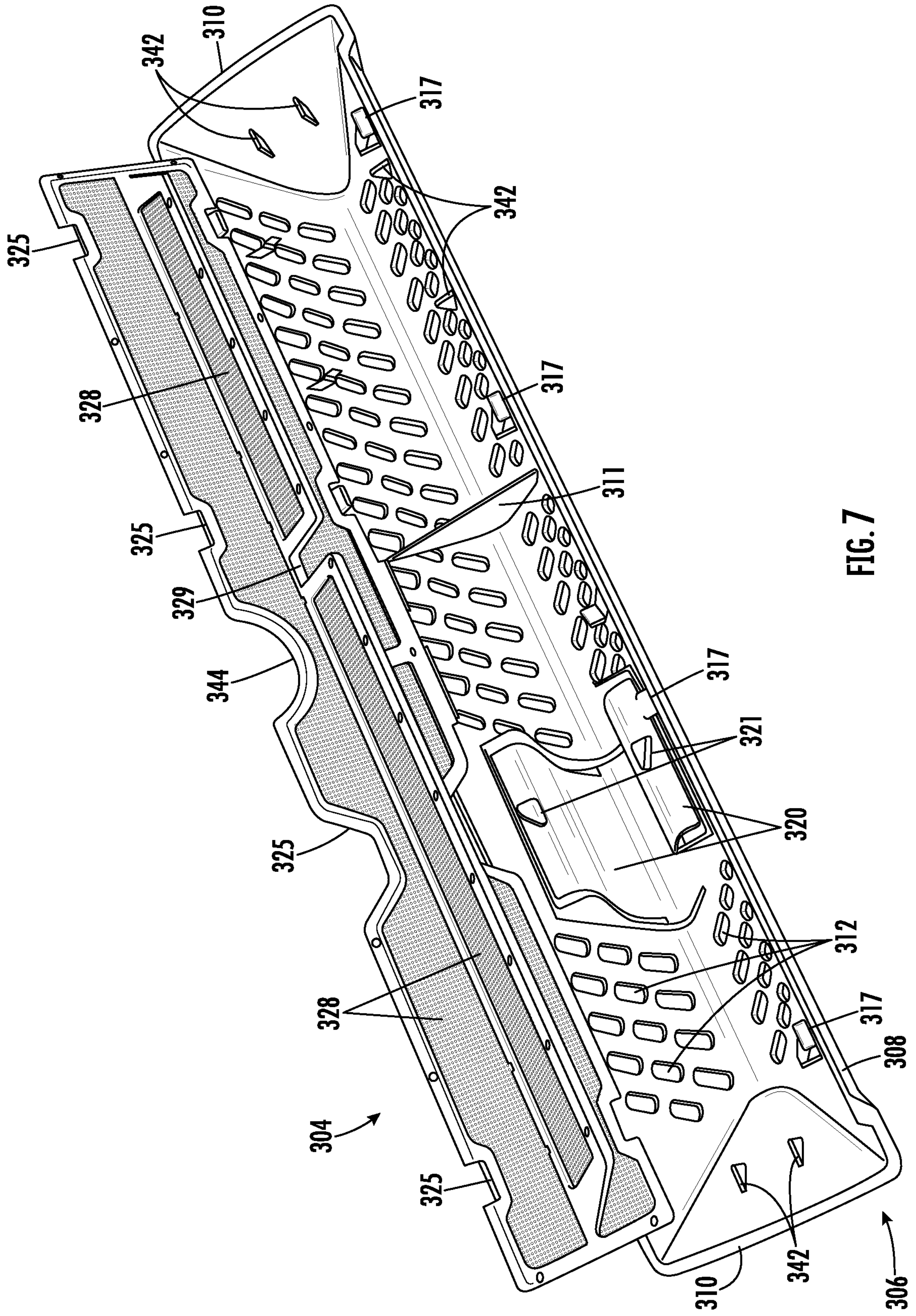
FIG. 7 illustrates an isometric view of the lifter cover with the filter element attached to the lifter cover in the open position, in accordance with one or more embodiments.

As seen in FIGS. 5-7, the lifter cover 304 defines a corresponding plurality of internal projections 317 along the length of the internal edges of the open rectangular bottom 303. These internal projections 317 extend laterally into the interior area defined by the lifter cover 304. The engaging hooks 316 may be sized and positioned to receive the internal projections 317 of the lifter cover 304. The projections 317 may be spaced away from the bottom edge of the lifter cover 304 to allow the bottom faces of the internal projections 317 to slide along the guide rails 314 into the engaging hooks 316, thereby securing the lifter cover 304 to the lifter base 302. In some examples, the internal projections 317 may form tapered protrusions that widen in the insertion direction to match the contour of the engaging hooks 316. The lifter cover 304 may accordingly be attached to the lifter base 302 by sliding the lifter cover 304 longitudinally onto the lifter base 302 (e.g., into the drum 106), and may be detached from the lifter base 302 by sliding the lifter cover 304 longitudinally off the lifter base 302 in the opposite direction (e.g., towards the door 116 out of the drum 106).

In one example, the lifter base 302 defines four equally spaced engaging hooks 316 along each long side of the lifter base 302, while the lifter cover 304 defines four corresponding internal projections 317 along each long side of the lifter cover 304. It should be noted that this is only one example, and different arrangements of engaging hooks 316 and internal projections 317 may be used. It should further be noted that the engaging hooks 316 and internal projections 317 may be reversed, and the lifter cover 304 may instead define the engaging hook 316 to capture projections extending outward from the lifter base 302.

The lifter cover 304 may also define a squeeze latch 318 molded into the body of the lifter cover 304. The squeeze latch 318 may define two resilient latch arms 320, free on the sides and bottom, and connected to the rest of the lifter cover 304 at the top of the lifter cover 304. Due to being free on the sides and bottom, the latch arms 320 can be bent inwards when squeezed together by an operator.

As best seen in FIGS. 5 and 7, angled snaps 321 extend downward from the bottom surfaces of the latch arms 320. The lifter base 302 may also define corresponding angled bosses 322 extending upwards from the main flat surface of the lifter base 302. The angled snaps 321 may define vertical surfaces that angle inwards towards the center of the lifter cover 304 along the direction of travel of the lifter cover 304 onto the lifter base 302. In an example, the angled bosses 322 may define corresponding vertical surfaces at the same angle as the angled snaps 321, The angled bosses 322 provide a surface for the angled snaps 321 to ride as the lifter cover 304 is slid longitudinally onto the lifter base 302. The two latch arms 320 may accordingly flex toward one another as the lifter cover 304 is slid onto the lifter base 302 and then resiliently flex back toward their original position once the angled snaps 321 pass beyond the angled bosses 322.

The angled snaps 321 may engage the flat surface behind the angled bosses 322, inhibiting movement of the lifter cover 304 off the lifter base 302. To uncouple the lifter cover 304, the operator presses the two latch arms 320 together, to allow the legs to move inward and allow the angled snaps 321 to pass between the angled bosses 322 as the lifter cover 304 is slid off the lifter base 302.

Returning to FIG. 4, the filter element 306 defines a rectangular base 324 sized to fit within the open rectangular bottom 303 of the lifter cover 304. The rectangular base 324 may define a generally flat, rectangular surface, although the rectangular base 324 may define one or more clearance cutaways 325 in its periphery. These clearance cutaway 325 may be sized to prevent mechanical interference with the internal projections 317 and/or the two latch arms 320.

Referring to FIG. 4, the filter element 306 further defines a perpendicular surface 326, extending upward from a midpoint of the rectangular base 324 along the length of the filter element 306. The height of the perpendicular surface 326 allows for the filter element 306 to extend upwards to the apex of the lifter cover 304. The rectangular base 324 and the perpendicular surface 326 may be formed of an overmolded mesh, to provide filtration surfaces 328 within the rectangular base 324 and the perpendicular surface 326 facilitating the flow of water and the capture of particulate. In one example, the overmolding may be performed of a plastic over a material such as a metal dryer filter mesh. In some examples, the perpendicular surface 326 may define cutouts 329 to provide clearance from any lateral ribs 311 of the lifter cover 304.

The filter element 306 may be hingedly attached to the lifter cover 304 by a snap-on hinge assembly 330. For example, the filter element 306 may define a series of two or more spaced apart mounts 332 and projecting from a longitudinal side of the rectangular base 324. The mounts 332 may be bridged by a pivot pin 334 which is parallel to and spaced away from the rectangular base 324 of the filter element 306.

As best seen in FIG. 6, the lifter cover 304 defines a hinge snap 336 defining a generally U-shaped or semi-circular hinge channel 338. The hinge snaps 336 may be snapped to the pivot pin 334 (such as illustrated in FIG. 3). When snapped on, the hinge snaps 336 allow the filter element 306 to rotate freely around the pivot pin 334 between open and closed positions. The hinge channel 338 may define hinge breaks 340 within the hinge channel 338 corresponding to the placement of the mounts 332. This may permit the mounts 332 to pass through the hinge breaks 340, thereby allowing the filter element 306 to pivot without interference with the mounts 332.

In the closed position, the rectangular base 324 may fit into the lifter cover 304 substantially parallel to the open rectangular bottom 303 of the lifter cover 304. As shown in FIGS. 6-7, the lifter cover 304 may define a series of stops 342 extending into the filter cavity 315. These stops 342 may collectively serve to limit the rotational movement of the filter element 306 into the lifter cover 304. The filter element 306 may rest onto the stops 342 inside the lifter cover 304 when in the closed position. In the open position, the filter element 306 may swing outwards for access and cleaning. The lifter cover 304 is shown in the closed position in FIG. 5, and in the open position in FIG. 7.

The lifter cover 304 may also define one or more filter latches 343 on the opposite side of the lifter cover 304 from the snap-on hinge assembly 330. The filter latch 343 may serve to secure the filter element 306 in place inside the lifter cover 304 and prevent rotation of the filter element 306 when in the closed position. The stops 342 and the filter latches 343 may be laterally spaced-apart and arranged to define a gap into which the filter element 306 may be rotated into and snapped into place in the closed position. As the filter latches 343 hold the filter element 306 in the closed position, the lifter cover 304 may be removed from the lifter base 302 without the filter element 306 undesirably rotating open and releasing any collected materials therefrom.

The filter element 306 may define a pull 344 (best shown in FIGS. 5-7) to allow the operator to overcome the resistance of the filter latches 343 and open the filter element 306. As shown in FIGS. 3-7, the pull 344 may be formed as a hemispherical finger relief into the rectangular base 324 of the filter element 306. The pull 344 may be placed in proximity to the filter latches 343 to allow the operator to grip the filter element 306 and apply force against the lifter cover 304. This action may allow the operator to overcome the filter latches 343 (e.g., by slightly bending the longitudinal wall 308 with the filter latches 343 away from the filter element 306), allowing the operator to move the filter element 306 into the open position. In the open position the operator may clear the filter element 306 of collected hair, lint, or other particulate. The filter element 306 may also be snapped out of the hinge snap 336 and removed from the lifter cover 304 entirely for further cleaning. Once cleaned, the filter element 306 may be snapped back into the hinge snap 336 and rotated into the closed position.

In some examples, an indication 346 may be formed into the mesh of the filtration surface 328 to instruct the operator on the function of the pull 344. This is shown, for example, in FIG. 5, where the indication 346 forms the word "pull" to indicate the function of the pull 344 to the operator.

Figure 8A:
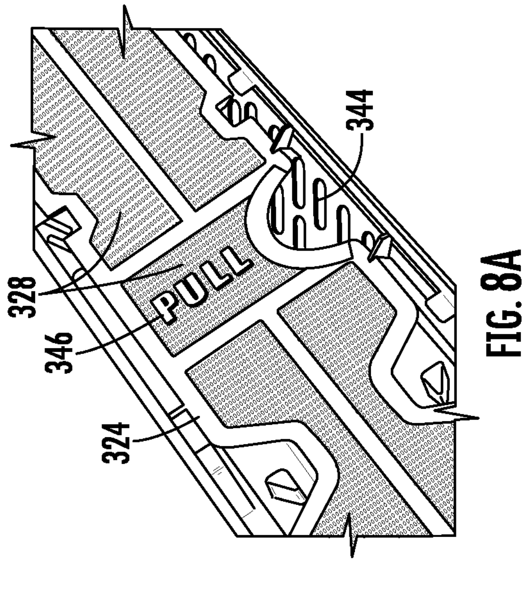
FIG. 8A illustrates a first variation on the design of the pull, in accordance with one or more embodiments.
Figure 8B:
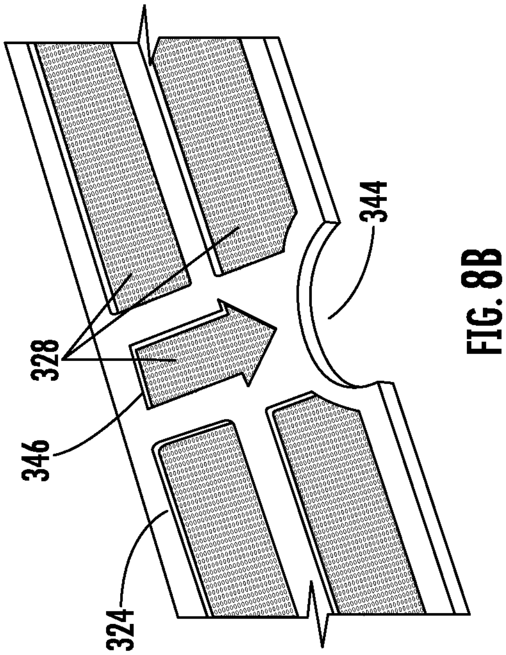
FIG. 8B illustrates a second variation on the design of the pull, in accordance with one or more embodiments.

FIGS. 8A-D illustrates variations on the design of the pull 344 and the indication 346. FIG. 8A illustrates a first variation, in which the indication 346 is illustrated in larger lettering than in FIG. 5. FIG. 8B illustrates a second variation, in which the indication 346 is expressed in the filtration surface 328 as an arrow pointing to the pull 344.

Figure 8C:
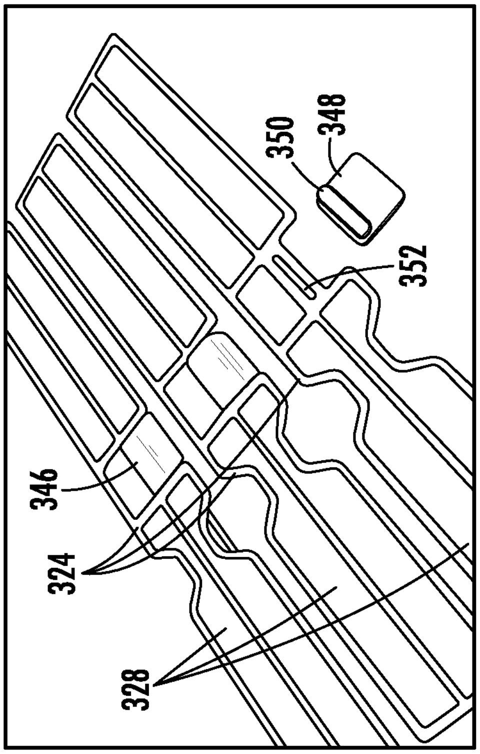
FIG. 8C illustrates a third variation on the design of the pull, in accordance with one or more embodiments.

FIG. 8C illustrated a third variation, in which a separate flexible pull piece 348 may include a protrusion that may be snapped into a slot in the filtration surface 328. The flexible pull piece 348 may be formed of a rubber or other flexible material to allow the flexible pull piece 348 to be grabbed and pulled upwards to move the filter element 306 into the open position. The indication 346 may be expressed on the flexible pull piece 348 instead of on the filtration surface 328.

Figure 8D:
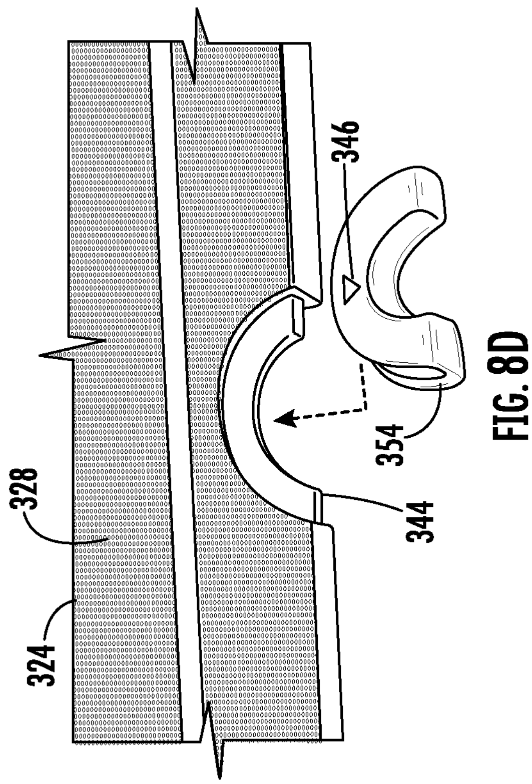
FIG. 8D illustrates a fourth variation on the design of the pull, in accordance with one or more embodiments.

FIG. 8D illustrated a third variation, in which a pull insert 350 is applied to the pull 344. Here, the pull insert 350 may be formed as a washer shape bent around over 180 degrees into a U-shape to define a slot 354 for insertion onto the circular edge of the pull 344.

In some examples, the appearance of the flexible pull piece 348 and/or pull insert 350 may vary to distinguish the type of filter element 306. For instance a first appearance (e.g., color, shape, pattern, and/or indication 346) may be used to indicate a filter element 306 having coarse filtration surfaces 328 for catching larger particulates, while a second appearance may be used to indicate a filter element 306 with fine filtration surfaces 328 for catching smaller particulates, but that may be too easily clogged if the wash water includes too many larger particulates.

When the filter element 306 is attached to the lifter cover 304, these components form a particulate filter 352 that can be attached to the lifter base 302. This particulate filter 352 includes the outer apertures or other through openings 312 that are formed in the first longitudinal wall 308A and the second longitudinal wall 308B of the lifter cover 304. These through openings 312 prevent larger items and particulate from entering into the inner volume of the lifter cover 304. The particulate filter 352 also includes the filter element 306 contained in the filter cavity 315 for capturing fine particulate. Together, the particulate filter 352 provides a multi-function filtering device within the processing space 120 of the drum 106.

Before a laundry cycle of the laundry treating appliance 100, an operator may slide the removable lifter cover 304 longitudinally onto the lifter base 302 in the drum 106. As the lifter cover 304 is slid longitudinally onto the lifter base 302, the bottom faces of the internal projections 317 slide along the guide rails 314 into the engaging hooks 316, while at the same time the angled bosses 322 provide a surface for the angled snaps 321 to ride. The two latch arms 320 may accordingly flex toward one another as the lifter cover 304 is slid onto the lifter base 302 and then resiliently flex back toward their original position once the angled snaps 321 pass beyond the angled bosses 322. The angled snaps 321 may engage the flat surface behind the angled bosses 322, inhibiting movement of the lifter cover 304 off the lifter base 302.

Once attached, the laundry cycle may be performed. During the cycle, water may flow into and out of the lifter cover 304 through the openings 312. This wash water may travel through the filtration surfaces 328 of the filter element 306, thereby causing particulate from the wash to be captured.

Once the cycle is complete, the operator may remove the lifter cover 304 from the lifter base 302. For example, the operator may squeeze the two latch arms 320 of the squeeze latch 318 together, to allow the legs to move inward and allow the angled snaps 321 to pass between the angled bosses 322, and then slide the lifter cover 304 longitudinally off of the lifter base 302. While being removed, the filter latches 343 hold the filter element 306 in the closed position, preventing the lifter cover 304 from rotating out of the lifter base 302.

To clean the filter element 306, the operator may use the pull 344 to grip the filter element 306 and apply force against the lifter cover 304. This action may allow the operator to overcome the filter latches 343 and move the filter element 306 into the open position. In the open position the operator may clear the filter element 306 of collected hair, lint, or other particulate. The hinge snap 336 of the filter element 306 may also be snapped off the pivot pin 334 to allow the filter element 306 to be removed from the lifter cover 304 entirely. Once cleaned, the filter element 306 may be snapped back onto the pivot pin 334 and/or rotated against the stops 342 into the closed position causing the filter element 306 to be locked by the filter latches 343. Once attached and locked, the lifter cover 304 may be reattached to the lifter base 302 for further use.

Figure 9:
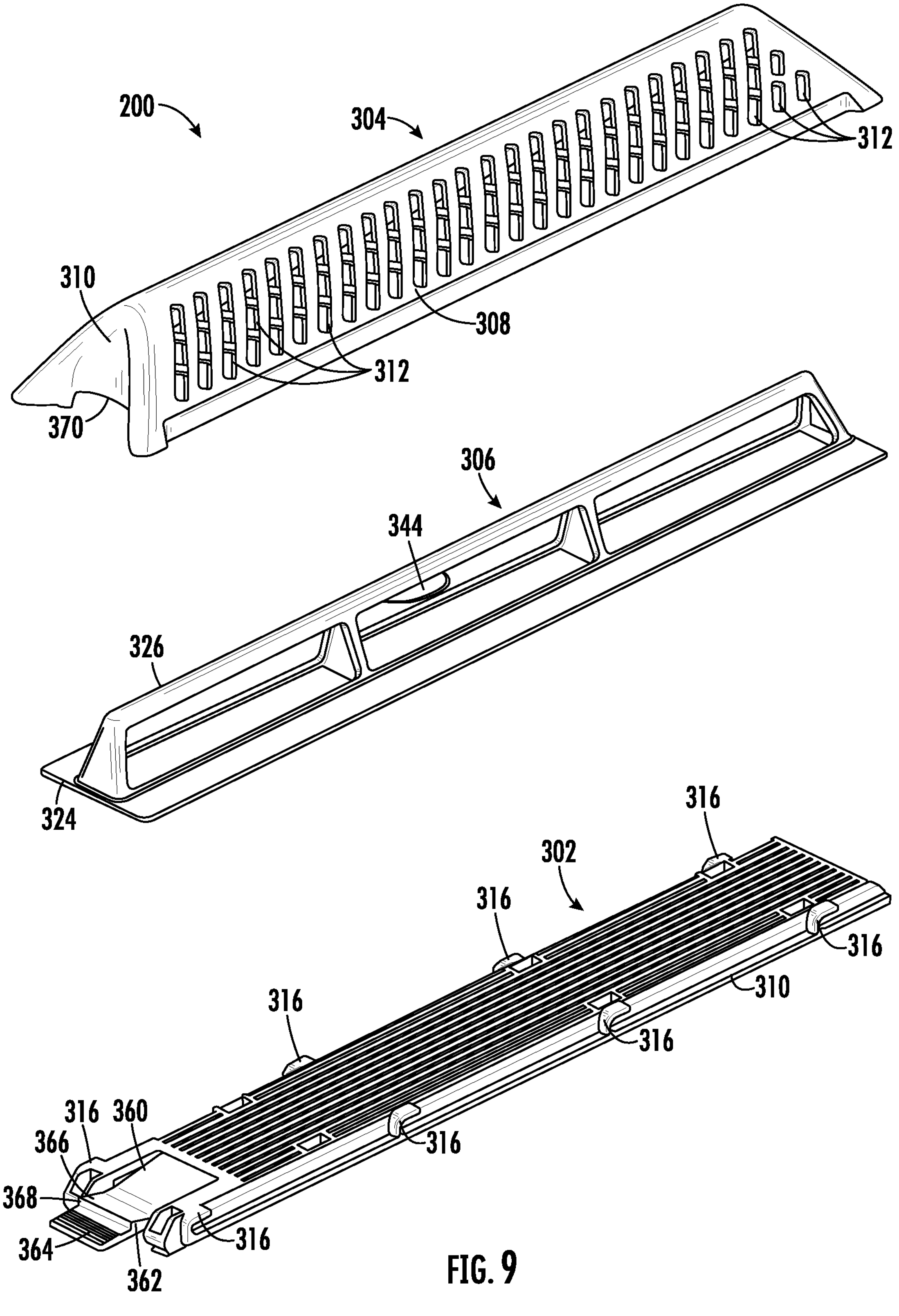
FIG. 9 illustrates an exploded isometric view of the components of an alternate removable filter apparatus, in accordance with one or more embodiments.
Figure 10:
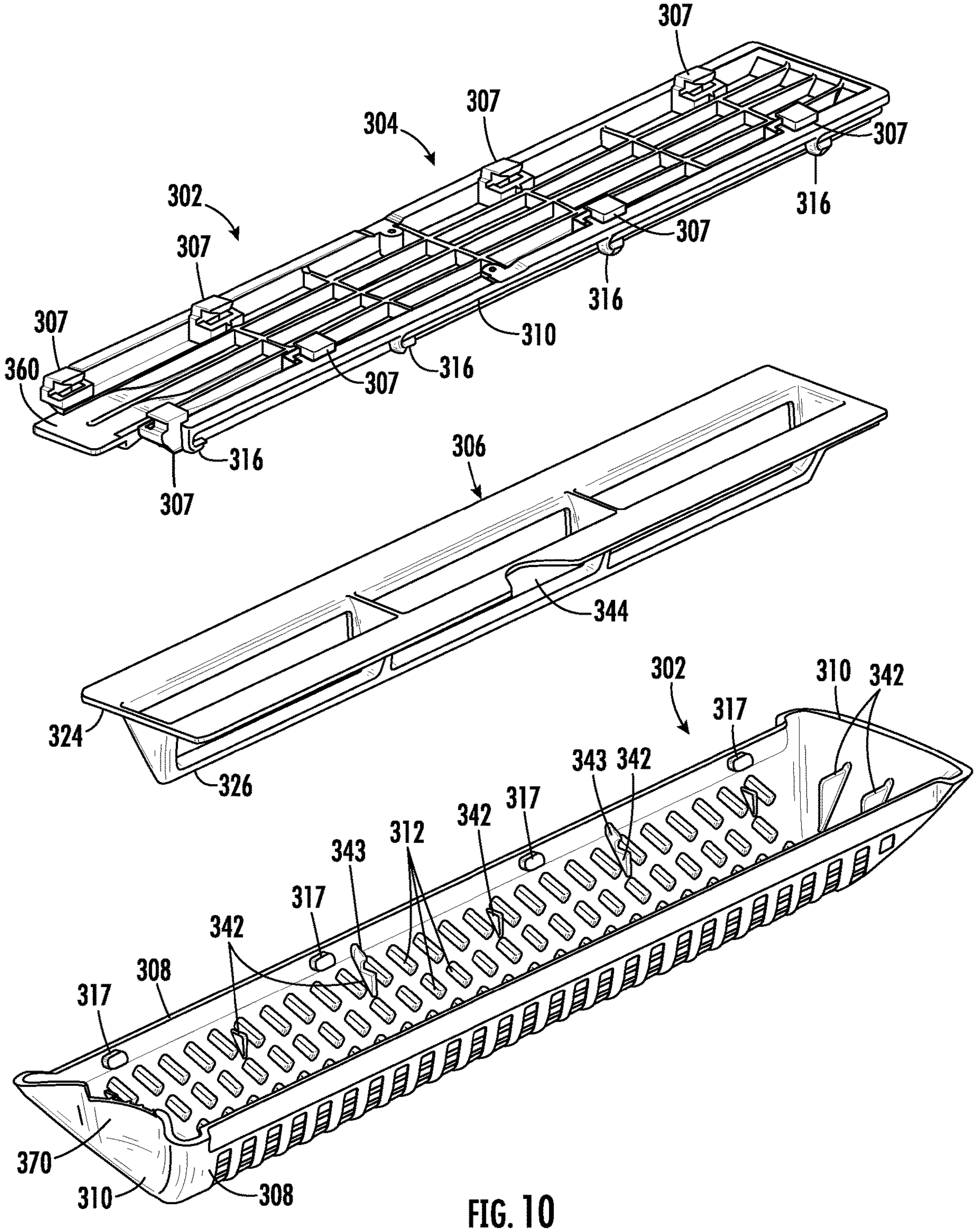
FIG. 10 illustrates an exploded isometric view of the underside of the components of the alternate removable filter apparatus of FIG. 9, in accordance with one or more embodiments.
Figure 11:
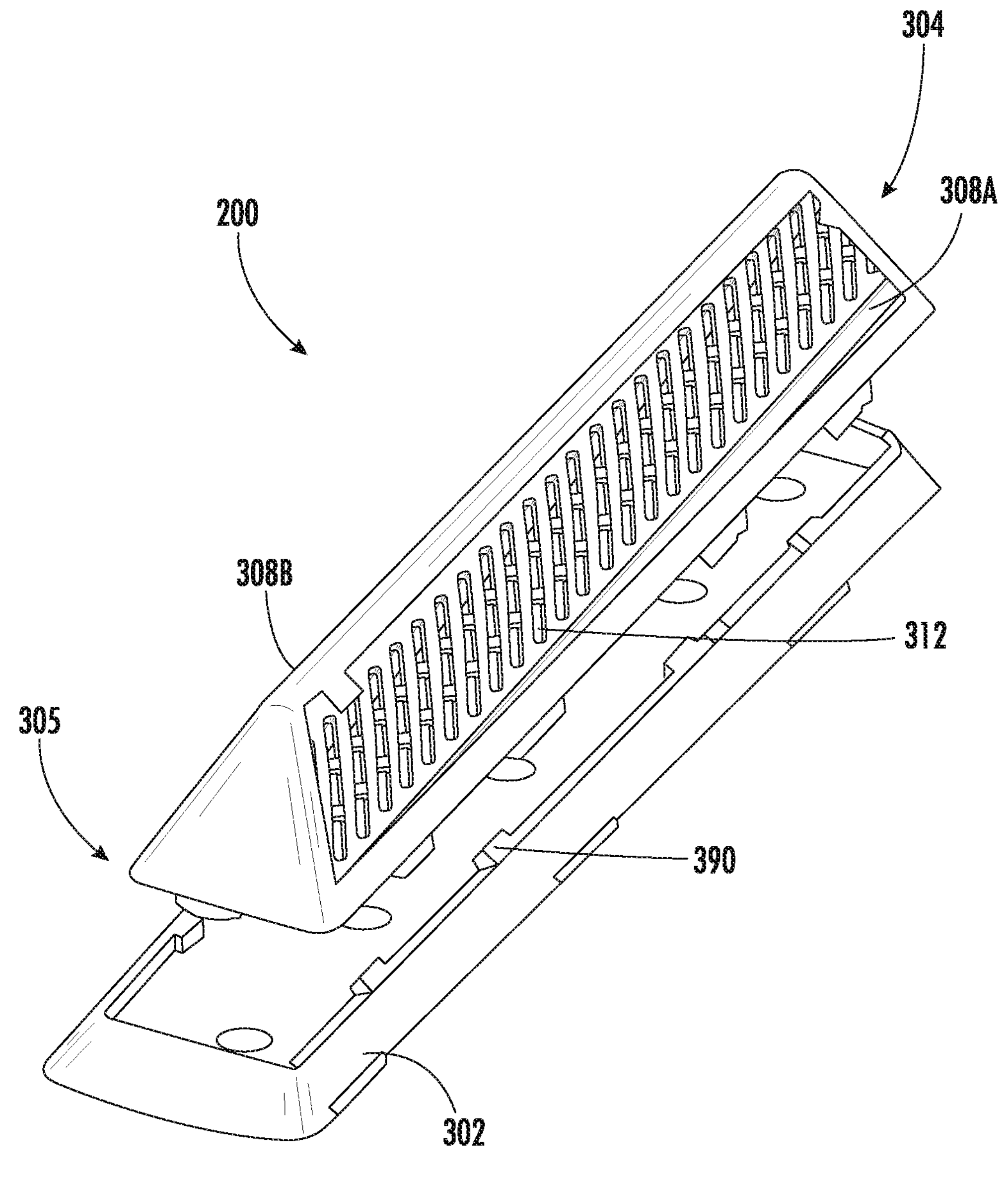
FIG. 11 illustrates a schematic diagram of an aspect of the filtering lifter and showing a lifter housing positioned adjacent to a base for the filtering lifter.
Figure 12:
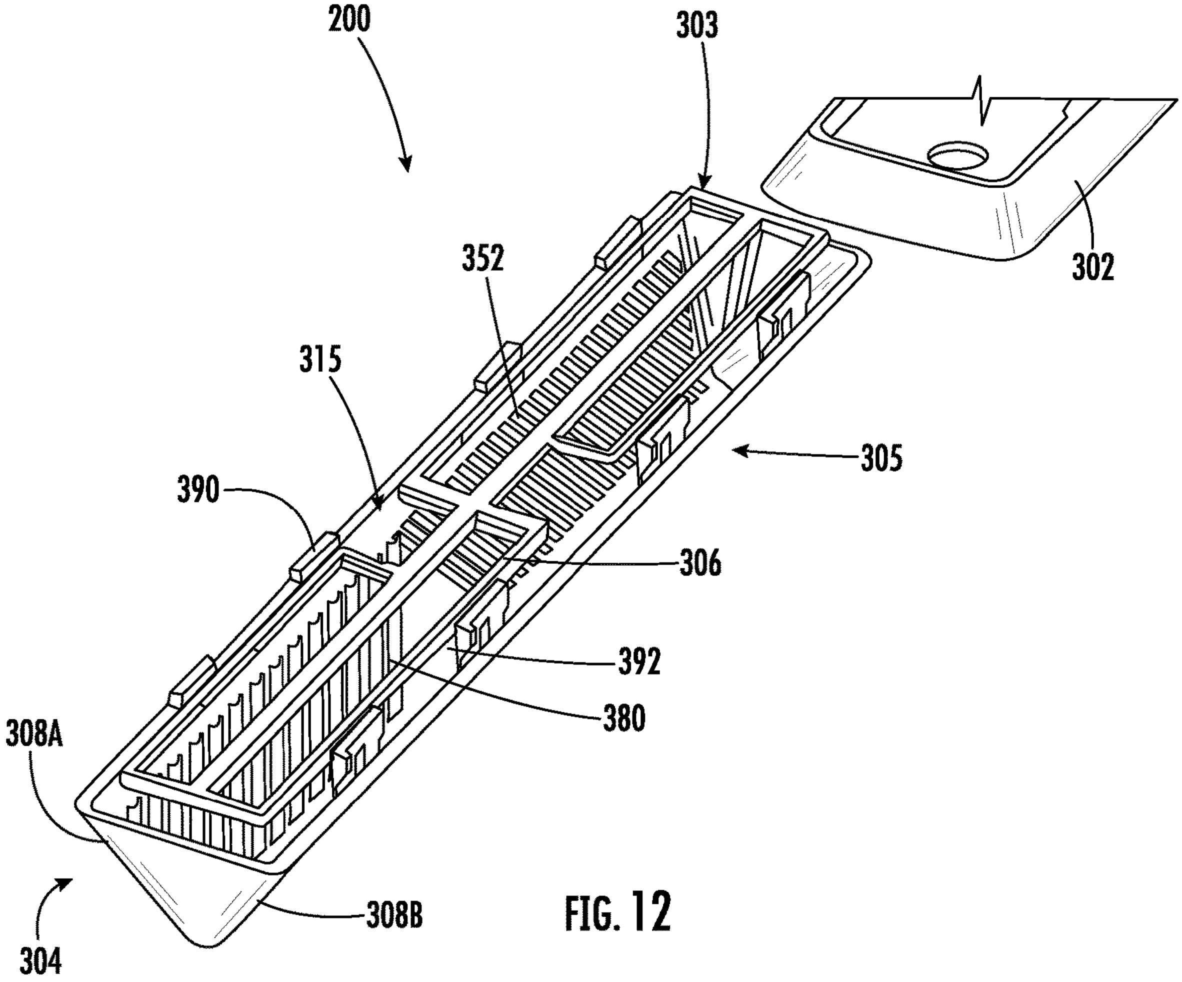
FIG. 12 illustrates a schematic diagram of the filtering lifter of FIG. 11 and showing the lifter housing inverted to reveal a filter member positioned within the lifter housing.
Figure 13:
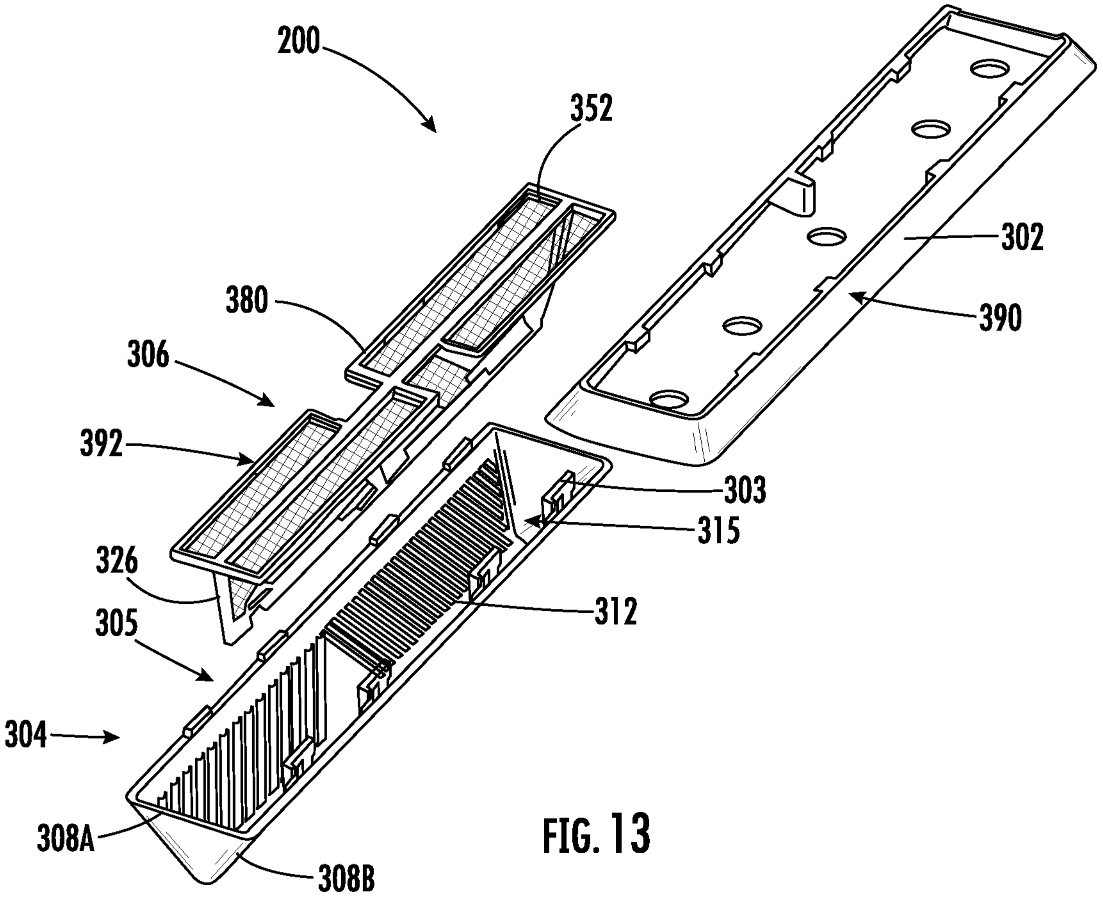
FIG. 13 illustrates an exploded perspective view of the filtering lifter of FIG. 11 and showing the filter member, the lifter housing and the base separated from one another.
Figure 14:
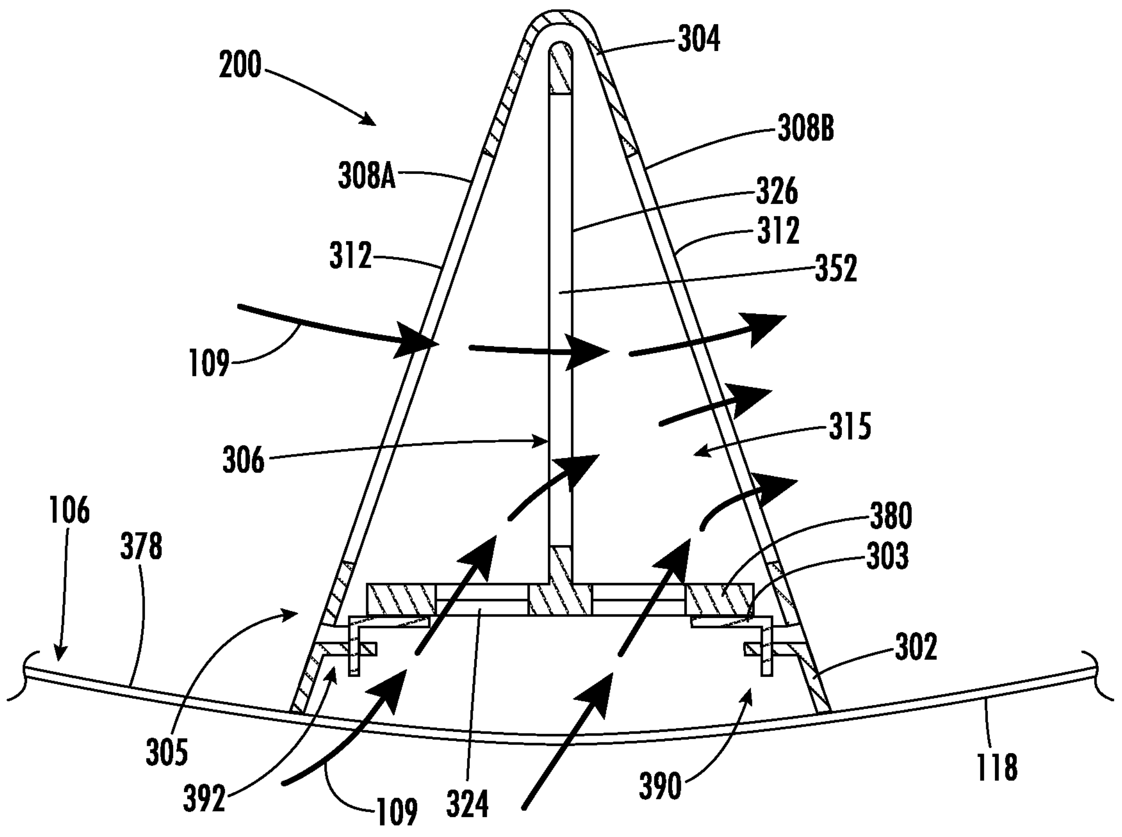
FIG. 14 illustrates a schematic cross-sectional view of the filtering lifter and showing directional movement of the wash fluid through the filtering lifter from within the processing space and through a perforated wall of the drum.
Figure 15:
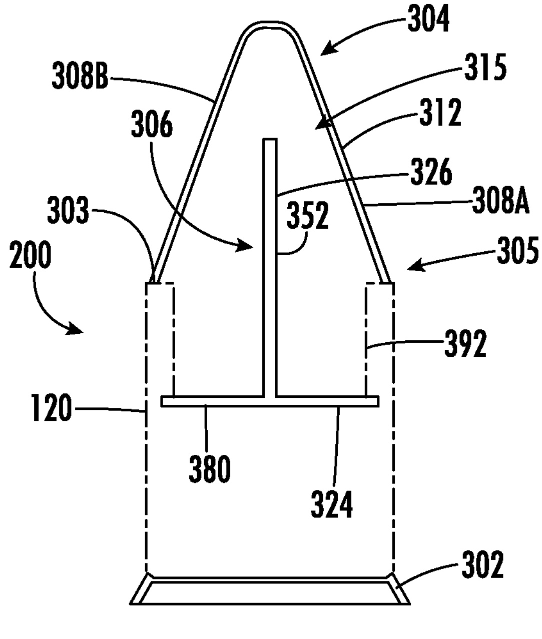
FIG. 15 illustrates a cross-sectional exploded view of the filtering lifter of FIG. 14 and showing an aspect of the engagement between the lifter housing and the filter member and the lifter housing and the base.

FIGS. 9-10 illustrate an alternate removable filter apparatus 200 having a slide lock mechanism as opposed to the squeeze latch 318. As shown in FIG. 9, the lifter base 302 of the alternate removable filter apparatus 200 defines a snap feature for securely fixing the lifter cover 304 to the lifter base 302, where the snap feature also provides for ease of release of the lifter cover 304 from the lifter base 302.

The snap feature may include a resilient cantilever arm 360 extending rearwards from the lifter base 302. As best seen in FIG. 9, the resilient cantilever arm 360 may define a locking lug 362 extending upwards from a distal end 364 of the cantilever arm 360. The locking lug 362 may provide a cam surface 366 onto which the open rectangular bottom 303 of the lifter cover 304 may ride. The locking lug 362 may end in a vertical locking shoulder 368, past which the filter element 306 may return to a lower height. The cam surface 366 may be angled upwards in the attachment direction, such that the cantilever arm 360 may flex downwards as the lifter cover 304 is slid onto the lifter base 302 and then resiliently flex back toward its original position once the end cap 310 of the lifter cover 304 passes beyond the locking lug 362. Once installed, the inner surface 370 of the lifter cover 304 may be retained against the flat vertical surface of the locking shoulder 368, inhibiting movement of the lifter cover 304 off the lifter base 302.

To unlock the lifter cover 304, the consumer may press down on the distal end 364, freeing the inner surface 370 from the vertical locking shoulder 368, and allowing the lifter cover 304 to be slid off. As there may be no snap-on hinge assembly 330 in the alternate removable filter apparatus 200, the pattern of openings 312 may extend across the longitudinal walls 308.

As best seen in FIG. 10, and similar to as discussed above, the lifter cover 304 may define a series of stops 342 to collectively limit the extent of the insertion of the filter element 306 into the lifter cover 304. The lifter cover 304 may additionally define one or more filter latches 343 above one or more of the stops 342. The stops 342 and filter latches 343 may collectively define a channel into which the lifter cover 304 may be held in place within the lifter cover 304.

Similar to as discussed above, the filter element 306 may define a pull 344 to allow the operator to overcome the resistance of the filter latches 343 and open the filter element 306. As shown in FIGS. 3-7, the pull 344 may be formed as a hemispherical finger relief into the rectangular base 324 of the filter element 306. The pull 344 may be placed in proximity to the filter latches 343 to allow the operator to grip the filter element 306 and apply force against the lifter cover 304. This action may allow the operator to overcome the filter latches 343 (e.g., by slightly bending the longitudinal wall 308 with the filter latches 343 away from the filter element 306), allowing the operator to move the filter element 306 into the open position.

FIGS. 11-15 illustrate another alternate removable filter apparatus 200 utilizing a press attachment mechanism. Referring to FIGS. 11-15, during use, the lifter cover 304 (sometimes referred to as a lifter housing) is attached to the lifter base 302 such that an inner volume of the lifter cover 304 is contained therein. Through this configuration, the filter element 306 is also contained within the inner volume of the lifter cover 304. This inner volume can also be described as a filter cavity 315 that is contained within the removable filter apparatus 200 for use within the drum 106. After completion of a particular laundry cycle, a user can disengage the lifter cover 304 from the lifter base 302. Once removed, the user can also remove the filter element 306 from the lifter cover 304 for removing captured particulate material such as pet hair, lint, and other smaller particulate. The particulate configured to be captured within the filter cavity 315 and within the filter element 306 of the removable filter apparatus 200 is typically smaller particulate. Larger items are typically too large to pass through the through openings 312 of the first longitudinal wall 308A or the second longitudinal wall 308B of the lifter cover 304. Those portions of particulate that are allowed to pass through the first longitudinal wall 308A and the second longitudinal wall 308B of the lifter cover 304 can then be captured within the filter element 306.

The through openings 312 of the lifter cover 304 can be defined as mesh surfaces or apertures, such as slots that are positioned within the first longitudinal wall 308A and the opposing second longitudinal wall 308B of the lifter cover 304 to promote the movement of wash fluid 109 through the filter cavity 315 and also through the filter element 306 contained within the lifter cover 304. In addition, the lifter cover 304 is typically open on the open rectangular bottom 303 side that engages the lifter base 302. This open lower section 305 of the lifter cover 304 allows wash fluid 109 to pass through the filter cavity 315 by moving through the perforations 118 of the drum 106. Accordingly, the lifter cover 304 provides a multi-directional filtering apparatus that can filter wash fluid 109 that is contained within the processing space 120 of the drum 106 and also wash fluid 109 that moves between the processing space 120 and an area outside of the processing space 120 that is contained between the drum 106 and the tub.

In addition, the lower section 305 of the lifter cover 304 can include various engagement features 390 that allow the filter element 306 to be attached to the lifter cover 304. The lifter cover 304 also includes engagement features 390 that also allow the lifter cover 304 to be attached to the lifter base 302, as is described more fully herein. For example, the engagement features 390 may include cantilevered snaps to allow the lifter cover 304 to be attached by aligning the engagement features 390 with corresponding apertures defined by the lifter base 302 and then pressing the lifter cover 304 into the lifter base 302. To remove the lifter cover 304 from the lifter base 302, the sides of the lifter cover 304 may be squeezed inwards, freeing engagement features 390 from the apertures, and allowing the lifter cover 304 to be lifted off of the lifter base 302.

Similar to the other removable filter apparatus 200, to further filter the wash fluid 109 from multiple directions, the filter element 306 can include a vertical component defining a perpendicular surface 326 to the rectangular base 324 that is configured to be positioned generally perpendicular to the inner surface 378 of the drum 106. In this manner, wash fluid 109 that moves through the first longitudinal wall 308A and/or the second longitudinal wall 308B of the lifter cover 304 can pass through this perpendicular surface 326 of the filter element 306. Also similar to above, the filter element 306 also includes a horizontal component as the rectangular base 324 that is positioned generally parallel with the perforations 118 of the drum 106. This rectangular base 324 is generally perpendicular to the perpendicular surface 326 and provides for filtering of the wash fluid 109 as it moves between an area within the drum 106, and within the filter cavity 315, and an area outside of the drum 106 through the perforations 118 thereof.

When the lifter cover 304 is attached to the lifter base 302, the filter element 306 is typically fully concealed within the inner volume of the lifter cover 304. The filter element 306 can include an outer frame 380 that is incorporated within one of the rectangular base 324 and/or the perpendicular surface 326 for forming an interference or mating engagement with the lifter cover 304. Accordingly, the filter element 306 and the lifter cover 304 can be attached to one another via a sliding engagement, a snapping engagement or other similar engaging relationship that secures the filter element 306 within the inner volume of the lifter cover 304.

When the filter element 306 is attached to the lifter cover 304, these components form a particulate filter 352 that can be attached to the lifter base 302. This particulate filter 352 includes the outer apertures or other through openings 312 that are formed in the first longitudinal wall 308A and the second longitudinal wall 308B of the lifter cover 304. These through openings 312 prevent larger items and particulate from entering into the inner volume of the lifter cover 304. The particulate filter 352 also includes the filter element 306 contained in the filter cavity 315 for capturing fine particulate. Together, the particulate filter 352 provides a multi-function filtering device within the processing space 120 of the drum 106.

Referring again to FIGS. 11-15, the lifter base 302 and the lifter cover 304 include a separate set of attaching mechanisms 392 that are typically separate from the engagement features 390 that attach the filter element 306 to the lifter cover 304. Accordingly, when the lifter cover 304 is attached to the lifter base 302, this attachment does not interfere with the engagement between the filter element 306 and the lifter cover 304.

According to the various aspects of the device, as exemplified in FIGS. 1-15, the removable filter apparatus 200 described herein is able to be removed from the drum 106 after each washing or drying cycle to remove particulate matter that is captured within the filter element 306. It is also contemplated that the filter element 306 can be removed periodically after a certain number of laundry cycles have been completed. These laundry cycles can include wash cycles, drying cycles, refreshing cycles, and other similar laundry cycles seen within washing, drying, and combination washing and drying laundry treating appliance 100. It is also contemplated that the removable filter apparatus 200 described herein is used as a supplement to other filtering mechanisms that are contained within the laundry treating appliance 100. Alternatively, it is contemplated that the removable filter apparatus 200 can be the primary filtering mechanism for the laundry treating appliance 100.

According to the various aspects of the device, the filtering mechanism incorporated within the filter element 306 can be in the form of a mesh material, a solid material having fine perforations, combinations thereof and other filtering mechanisms. It is also contemplated that the filtering mechanism utilized within the perpendicular surface 326 can be the same or different from the filtering mechanism incorporated within the rectangular base 324 of the filter element 306.

Figure 16:
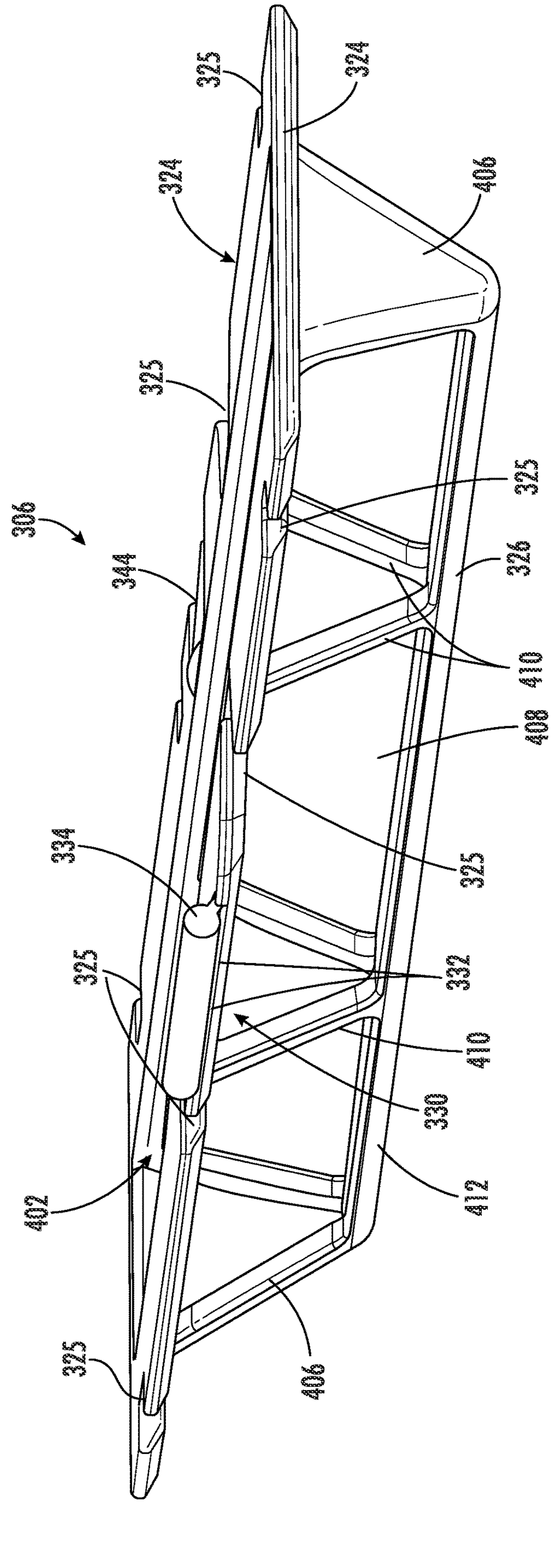
FIG. 16 illustrates a perspective view of a V-shaped filter element for a removable filter apparatus, in accordance with one or more embodiments.

FIG. 16 illustrates a perspective view of a V-shaped filter element 306 for a removable filter apparatus 200, in accordance with one or more embodiments. As shown, the filter element 306 defines a rectangular base 324 sized to fit within the open rectangular bottom 303 of the lifter cover 304. The lifter cover 304 may be any of the various lifter covers 304 discussed herein. The rectangular base 324 may define a generally flat, rectangular surface, although the rectangular base 324 may define one or more clearance cutaways 325 in its periphery. These clearance cutaways 325 may be sized to prevent mechanical interference with the internal projections 317 and/or the two latch arms 320.

The filter element 306 further defines a perpendicular surface 326, extending upward from a midpoint of the rectangular base 324 along the length of the filter element 306. Similar to as shown in FIG. 9, the perpendicular surface 326 may be integral to the rectangular base 324 and may define a particulate capture chamber 402 extending upwards from the rectangular base 324. This is as opposed to, for example, the removable filter apparatus 200 shown in FIGS. 3-7 having a flat perpendicular surface 326 without an internal particulate capture chamber 402.

In this alternative V-shaped removable filter apparatus 200 as shown in FIG. 16, the particulate capture chamber 402 may be centered along a midpoint of the rectangular base 324 along the length of the filter element 306 and may expose an open bottom 404 through the rectangular base 324. (The filter element 306 as shown is oriented with the open bottom 404 up to better illustrate the open bottom 404.)

To form the particulate capture chamber 402, the filtration surface 328 defines a hollow generally trapezoidal prism shaped chamber extending upwards from the midpoint of the rectangular base 324. The particulate capture chamber 402 is open from below through the open bottom 404 of the rectangular base 324. The filtration surface 328 defines two generally trapezoidal longitudinal walls 406 of a generally consistent thickness along the longitudinal direction of the filter element 306, and two end caps 408 at either end of the filtration surface 328 that connect between the longitudinal walls 406 to collectively define the open bottom 404. The two end caps 408 may in many examples be of a generally triangular shape and may slope inwards towards an apex of the filtration surface 328, such that the length at the apex is less than the length of the rectangular base 324. This angling in may be done to ensure the filter element 306 fits within the narrowing shape of the lifter cover 304. The filtration surface 328 may also define one or more lateral ribs 410 connecting between the longitudinal walls 406 to increase rigidity of the filtration surface 328.

The height of the perpendicular surface 326 allows for the filter element 306 to extend upwards towards the apex 412 of the lifter cover 304. At least a portion of the rectangular base 324 and the perpendicular surface 326 may be formed of an overmolded mesh. The mesh is not shown in FIG. 16 to better illustrate the structure, but examples of a similar filter element 306 showing the mesh surface may be seen in FIGS. 19-20 as discussed below. The mesh accordingly provides filtration surfaces 328 through at least the perpendicular surface 326 (and optionally also the rectangular base 324) facilitating the flow of water and the capture of particulate. In one example, the overmolding may be performed of a plastic over a material such as a metal dryer filter mesh. In some examples, the perpendicular surface 326 may define cutouts 329 to provide clearance from any lateral ribs 311 of the lifter cover 304.

Figure 17:
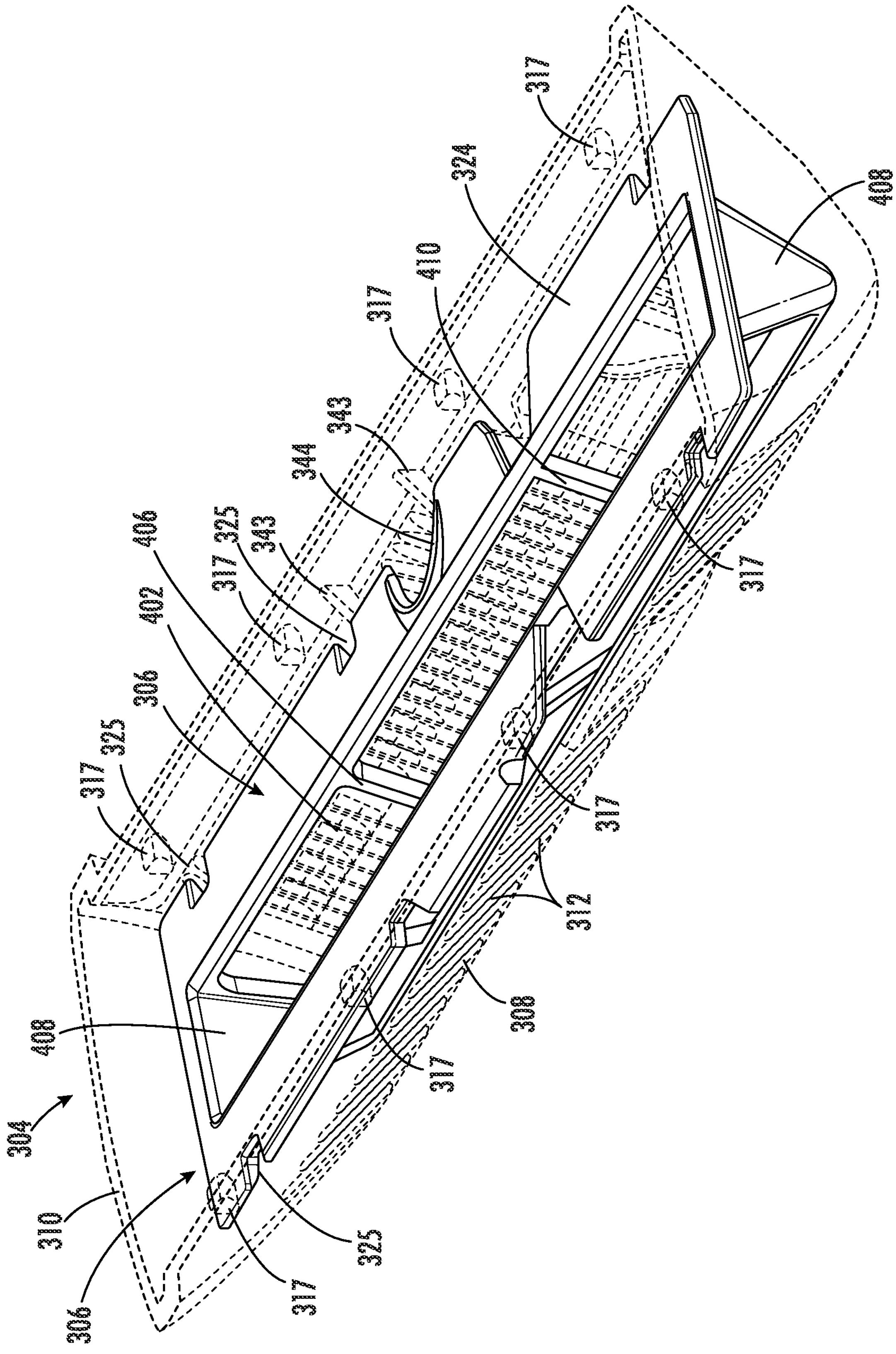
FIG. 17 illustrates a perspective view of the filter element of FIG. 16 installed to the filter cover.

FIG. 17 illustrates a perspective view of the filter element 306 of FIG. 16 installed to the filter cover. As shown, and similar to as discussed with respect to FIG. 6, the filter element 306 may be hingedly attached to the lifter cover 304 by a snap-on hinge assembly 330. For example, the filter element 306 may define spaced apart mounts 332 projecting from a longitudinal side of the rectangular base 324. The mounts 332 may be bridged by a pivot pin 334 which is parallel to and spaced away from the rectangular base 324 of the filter element 306. Also as discussed with respect to FIG. 6, the lifter cover 304 may define a hinge snap 336 defining a generally U-shaped or semi-circular hinge channel 338. The hinge snaps 336 may be snapped to the pivot pin 334 as shown in FIG. 17. When snapped on, the hinge snaps 336 allow the filter element 306 to rotate freely around the pivot pin 334 between open and closed positions.

The closed position is shown in FIG. 17, with the filter latches 343 serving to secure the filter element 306 in place inside the lifter cover 304 and prevent rotation of the filter element 306. In this position, the lifter cover 304 may be removed from the lifter base 302 without the filter element 306 undesirably rotating open and releasing any collected materials therefrom.

The pull 344 may be placed in proximity to the filter latches 343 to allow the operator to grip the filter element 306 and apply force against the lifter cover 304. This action may allow the operator to overcome the filter latches 343 to move the filter element 306 into the open position. In the open position the operator may clear the filter element 306 of collected hair, lint, or other particulate. The filter element 306 may also be snapped out of the hinge snap 336 and removed from the lifter cover 304 entirely for further cleaning. Once cleaned, the filter element 306 may be snapped back into the hinge snap 336 and rotated into the closed position.

Figure 18:
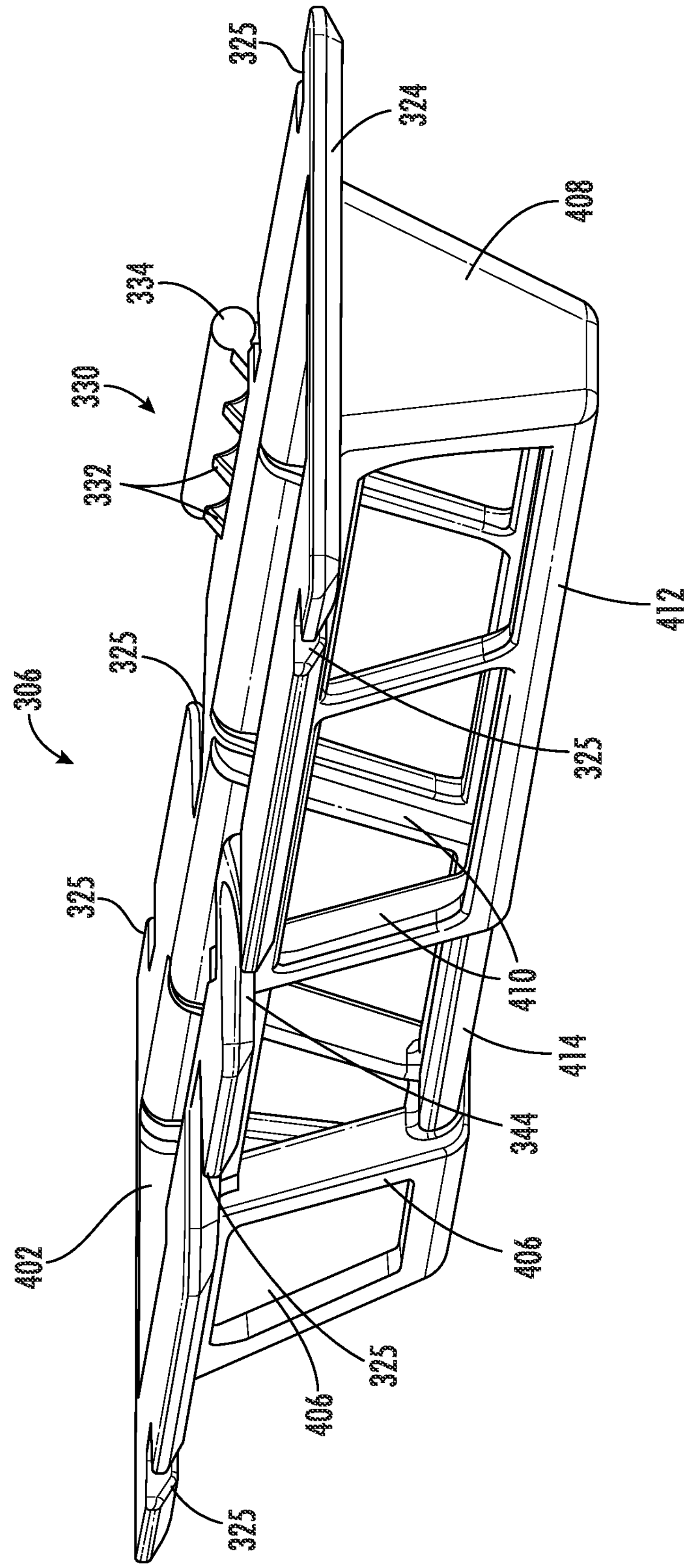
FIG. 18 illustrates a perspective view of a filter element for an alternative wide-V-shaped filter element for a removable filter apparatus, in accordance with one or more embodiments.

FIG. 18 illustrates a perspective view of an alternative wide-V-shaped filter element 306 for a removable filter apparatus 200, in accordance with one or more embodiments. As shown, the filter element 306 again defines a rectangular base 324 sized to fit within the open rectangular bottom 303 of the lifter cover 304. The lifter cover 304 may be any of the various lifter covers 304 discussed herein. As compared to the V-shaped filter element 306 shown in FIGS. 16-17, the alternative wide-V-shaped removable filter apparatus 200 may define a particulate capture chamber 402 having greater width. This may be accomplished by the apex 412 of the filter element 306 in FIG. 18 defining a flat top surface, as opposed to meeting at a rounded point as shown in FIGS. 16-17. Additionally, in such an example the end caps 408 are of a generally trapezoidal shape due to the width of the apex 412, as opposed to the generally triangular end caps 408 discussed previously. Thus, in this variation the filtration surface 328 defines two generally trapezoidal longitudinal walls 406 of a generally consistent thickness along the longitudinal direction of the filter element 306, and two end caps 408 at either end of the filtration surface 328 that connect between the longitudinal walls 406 to collectively define the open bottom 404.

Similar to as discussed above, the end caps 408 may slope inwards towards the apex 412 of the filtration surface 328, such that the length of the particulate capture chamber 402 at the apex 412 is less than the length of the rectangular base 324. Also, the filtration surface 328 may again define one or more lateral ribs 410 connecting between the longitudinal walls 406 to increase the rigidity of the filtration surface 328. At least a portion of the rectangular base 324 and the filtration surface 328 may also be formed of an overmolded mesh to provide filtration surfaces 328 within the rectangular base 324 and/or the filtration surface 328. As before, the filter element 306 may be hingedly attachable to the lifter cover 304 by a snap-on hinge assembly 330.

The greater width of the particulate capture chamber 402 may provide additional space for the capture of pet hair and other particulates. However, in some examples, this greater width may require clearance with respect to the squeeze latch 318 features. Accordingly, the longitudinal walls 406 of the particulate capture chambers 402 may define a narrowed portion 414 with reduced width along the length of the particulate capture chambers 402 in proximity to the squeeze latch 318. This may allow the two latch arms 320 of the squeeze latch 318 to operate without coming into contact with the longitudinal walls 406 of the filter element 306.

Figure 19:
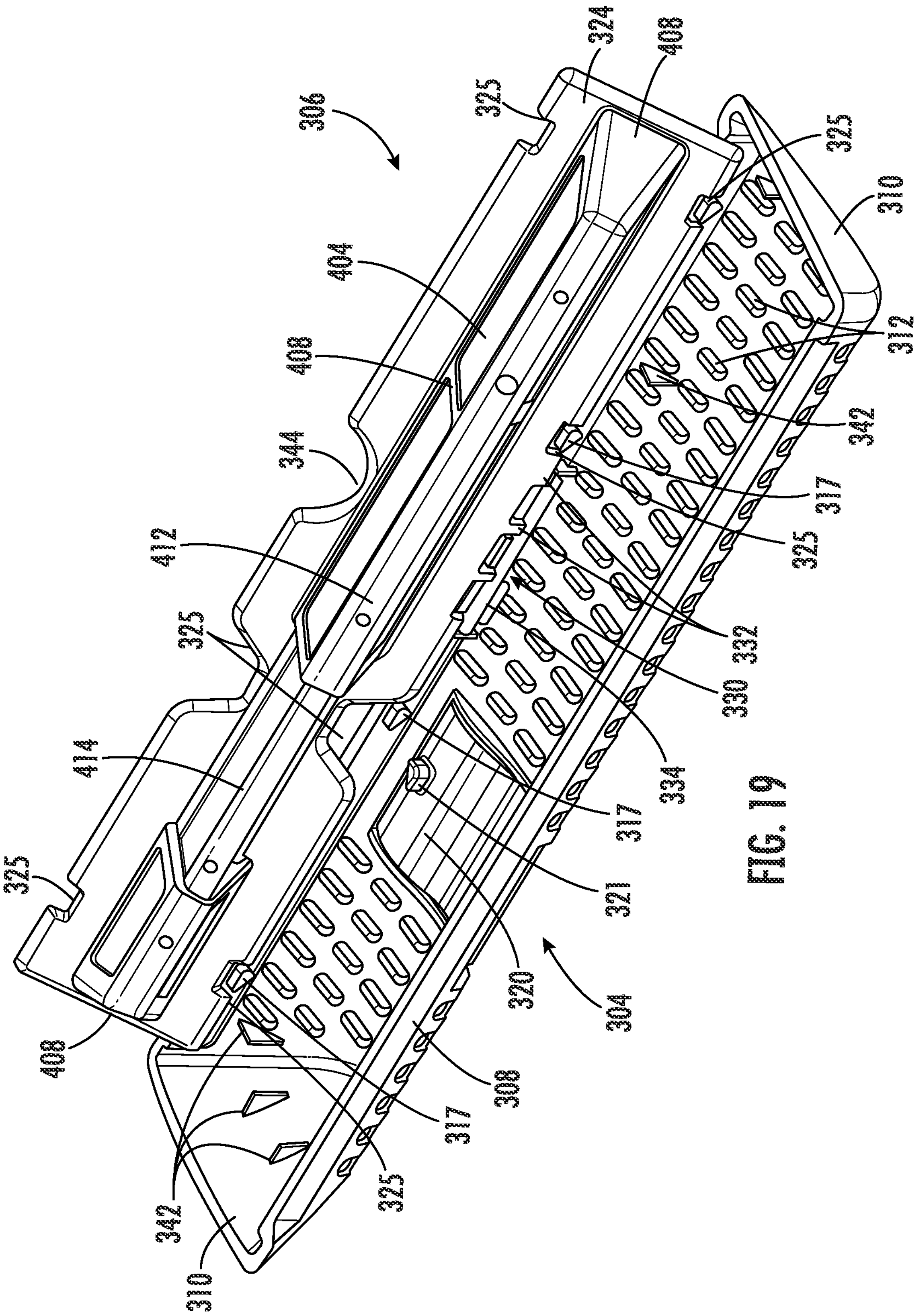
FIG. 19 illustrates a perspective view of the filter element of FIG. 18 installed to the lifter cover in an open position.
Figure 20:
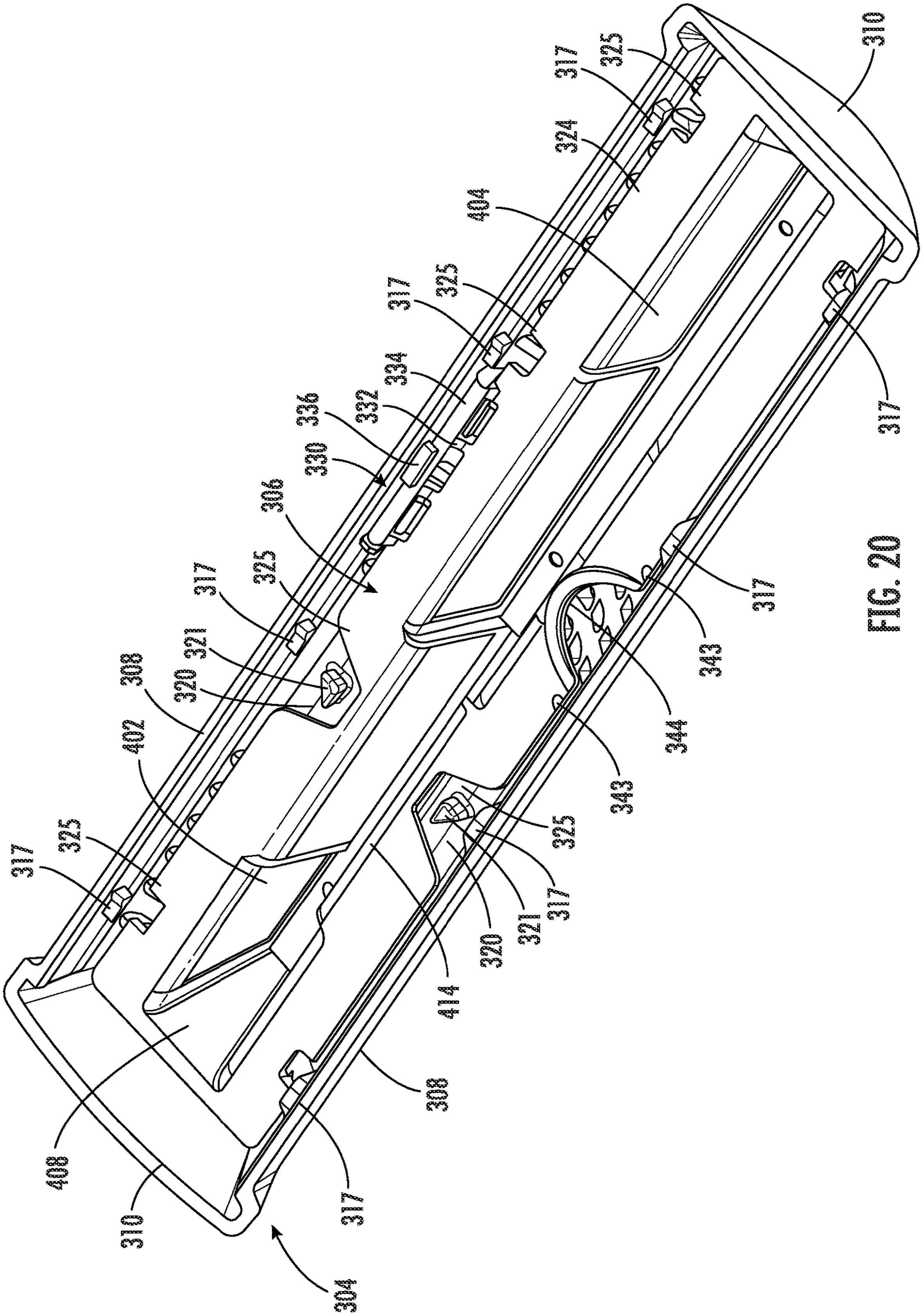
FIG. 20 illustrates a perspective view of the filter element of FIG. 18 installed to the lifter cover in a closed position.

FIG. 19 illustrates a perspective view of the filter element 306 of FIG. 18 installed to the lifter cover 304 in an open position. FIG. 20 illustrates a perspective view of the filter element 306 of FIG. 18 installed to the lifter cover 304 in a closed position. As before, to clean the filter element 306 the operator may use the pull 344 to grip the filter element 306 and apply force against the lifter cover 304. This action may allow the operator to overcome the filter latches 343 and move the filter element 306 into the open position. In the open position the operator may clear the filter element 306 of collected hair, lint, or other particulate. The hinge snap 336 of the filter element 306 may also be snapped off the pivot pin 334 to allow the filter element 306 to be removed from the lifter cover 304 entirely. Once cleaned, the filter element 306 may be snapped back onto the pivot pin 334 and/or rotated against the stops 342 into the closed position causing the filter element 306 to be locked by the filter latches 343. Once attached and locked, the lifter cover 304 may be reattached to the lifter base 302 for further use.

Figure 21:
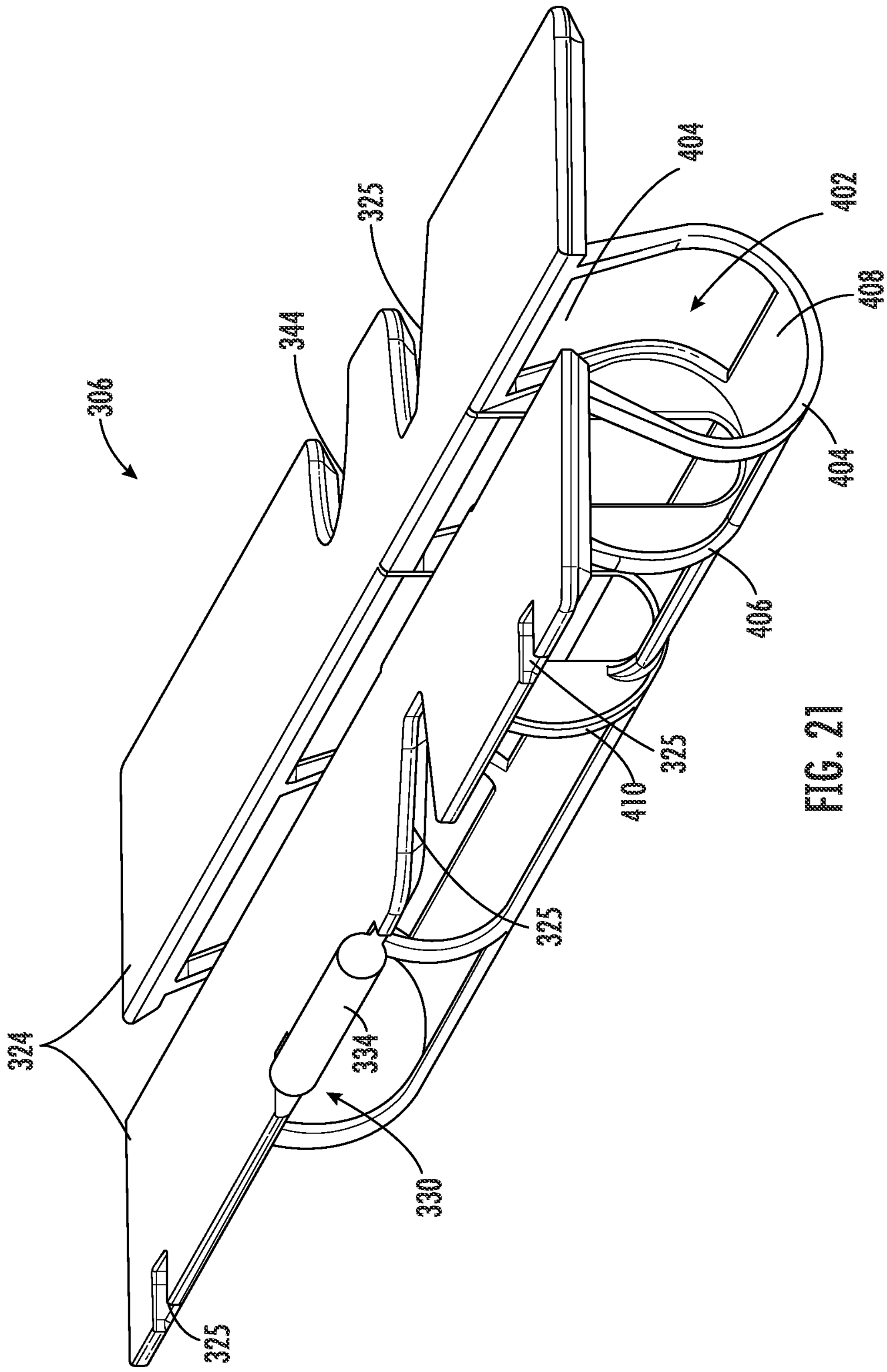
FIG. 21 illustrates a perspective view of a teardrop-shaped filter element for the removable filter apparatus, in accordance with one or more embodiments.

FIG. 21 illustrates a perspective view of an alternative filter element 306 for the removable filter apparatus 200 having a teardrop-shaped center portion, in accordance with one or more embodiments. As shown, the filter element 306 defines a rectangular base 324 sized to fit within the open rectangular bottom 303 of the lifter cover 304. The lifter cover 304 may be any of the various lifter covers 304 discussed herein. As compared to the V-shaped filter element 306 shown in FIGS. 16-17, and the alternative wide-V-shaped filter element 306 shown in FIGS. 18-20, in this example the particulate capture chamber 402 is defined by a single curved longitudinal wall 406.

As shown, the filtration surface 328 defines a longitudinal wall 406 having an upside-down teardrop shaped profile along the length of the rectangular base 324. (The filter element 306 as shown is oriented with the open bottom 404 up to better illustrate the open bottom 404.) The longitudinal wall 406 may define the teardrop shaped profile as a semi-circular top tapering inwards to connect to the rectangular base 324 of the filter element 306. The particulate capture chamber 402 may be open from below through the open bottom 404 of the rectangular base 324. The particulate capture chamber 402 may further define two end caps 408 at either end of the filtration surface 328 that enclose the ends of the longitudinal wall 308 to collectively define the particulate capture chamber 402. In such an example the end caps 408 are also of a generally teardrop shape due to the profile of the particulate capture chamber 402.

As shown, the particulate capture chamber 402 extends the entire length of the rectangular base 324, such that the open bottom 404 bisects the rectangular base 324 into two parallel sections. However, it should be noted that this is only an example, and in other instances the particulate capture chamber 402 may not extend the entire length along the rectangular base 324, such that the opposite sections of the rectangular base 324 are connected.

Similar to as discussed above, the end caps 408 may slope inwards towards the apex 412 of the filtration surface 328, such that the length of the particulate capture chamber 402 at the apex 412 is less than the length of the rectangular base 324. Also, the filtration surface 328 may again define one or more lateral ribs 410 connecting between the longitudinal walls 406 to increase the rigidity of the filtration surface 328. At least a portion of the rectangular base 324 and the filtration surface 328 may also be formed of an overmolded mesh to provide filtration surfaces 328 within the rectangular base 324 and/or the filtration surface 328. As before, the filter element 306 may be hingedly attachable to the lifter cover 304 by a snap-on hinge assembly 330.

Similar to the wide-V variation, the width of the particulate capture chamber 402 may provide additional space for the capture of pet hair and other particulates but may require clearance with respect to the squeeze latch 318 features. Accordingly, the longitudinal wall 406 of the particulate capture chambers 402 may define a narrowed portion 414 with reduced width along the length of the particulate capture chambers 402 in proximity to the squeeze latch 318, to allow the two latch arms 320 of the squeeze latch 318 to operate without interference from the tear-shaped longitudinal wall 406.

As before, to clean the filter element 306 the operator may use the pull 344 to grip the filter element 306 and apply force against the lifter cover 304. This action may allow the operator to overcome the filter latches 343 and move the filter element 306 into the open position. In the open position the operator may clear the filter element 306 of collected hair, lint, or other particulate. The hinge snap 336 of the filter element 306 may also be snapped off the pivot pin 334 to allow the filter element 306 to be removed from the lifter cover 304 entirely. Once cleaned, the filter element 306 may be snapped back onto the pivot pin 334 and/or rotated against the stops 342 into the closed position causing the filter element 306 to be locked by the filter latches 343. Once attached and locked, the lifter cover 304 may be reattached to the lifter base 302 for further use.

By having the teardrop shaped profile, this filter element 306 may retain pet hair within the wider upper portion of the particulate capture chamber 402 that is less prone to fall out through the relatively more narrow open bottom 404. Thus, the particulate may be more easily retained when the lifter cover 304 is removed from the lifter base 302 to clean the particulate capture chamber 402 of the filter element 306.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A filter element for a removable filter apparatus of a laundry treating appliance, comprising:

a rectangular base;

a filtration surface, integral to the rectangular base, defining a particulate capture chamber extending upwards from the rectangular base, the particulate capture chamber being centered along a midpoint of the rectangular base along the length of the filter element, the particulate capture chamber having an open bottom through the rectangular base;

a plurality of spaced-apart mounts projecting from a longitudinal side of the rectangular base; and a pivot pin bridging the spaced-apart mounts, the pivot pin being parallel to and spaced away from the rectangular base, the pivot pin configured to be resiliently snapped into and out of a hinge channel of a lifter cover to rotatably and removably couple the filter element to the lifter cover.

2. The filter element of claim 1, wherein the particulate capture chamber defines a generally trapezoidal and hollow prism shaped chamber extending upwards from the midpoint of the rectangular base, the particulate capture chamber being open from below through the open bottom of the rectangular base.

3. The filter element of claim 2, wherein the filtration surface defines two generally trapezoidal longitudinal walls of a generally consistent thickness along the longitudinal direction of the filter element, and two end caps at either end of the filtration surface that connect between the longitudinal walls to collectively define the open bottom.

4. The filter element of claim 3, wherein the end caps are of a generally triangular shape.

5. The filter element of claim 3, wherein the end caps are of a generally trapezoidal shape.

6. The filter element of claim 3, wherein the end caps slope inwards towards an apex of the filtration surface, such that the length at the apex is less than the length of the rectangular base.

7. The filter element of claim 3, wherein the filtration surface defines one or more lateral ribs connecting between the longitudinal walls to increase rigidity of the filtration surface.

8. The filter element of claim 1, wherein the particulate capture chamber defines a longitudinal wall having a teardrop shaped profile along the length of the rectangular base, the teardrop shaped profile defining a semicircular top tapering inwards to connect to the rectangular base of the filter element, the particulate capture chamber being open from below through the open bottom of the rectangular base.

9. The filter element of claim 8, wherein the particulate capture chamber further defines two end caps at either end of the filtration surface that enclose the ends of the longitudinal wall to collectively define the particulate capture chamber.

10. The filter element of claim 1, wherein at least a portion of the rectangular base and the filtration surface are formed of an overmolded mesh to provide filtration surfaces within the rectangular base and/or the filtration surface.

11. The filter element of claim 1, wherein the filter element defines a pull formed into the rectangular base of the filter element.

12. The filter element of claim 11, wherein the pull is formed as a finger relief recessed into a peripheral edge of the rectangular base of the filter element opposite the longitudinal side defining the spaced-apart mounts.

13. A removable filter apparatus for a laundry treating appliance, comprising:

a lifter cover, defining a generally trapezoidal prism shape with an open rectangular bottom, the lifter cover being slidably attachable along the open rectangular bottom to a lifter base of an inner circumferential surface of a drum of the laundry treating appliance, the lifter cover defining through openings to allow for free flow of water, the lifter cover further defining a hinge snap having a hinge channel extending along an interior longitudinal edge of the lifter cover; and a filter element, selectively attachable to the lifter cover, the filter element sized to fit within the lifter cover to allow the filter element to capture particulate within the water flow, the filter element defining a rectangular base, and a filtration surface, integral to the rectangular base, defining a particulate capture chamber extending upwards from the rectangular base, the particulate capture chamber being centered along a midpoint of the rectangular base along the length of the filter element, the particulate capture chamber having an open bottom through the rectangular base, the filter element further defining a plurality of spaced-apart mounts projecting from a longitudinal side of the rectangular base and a pivot pin bridging the mounts parallel to and spaced away from the rectangular base, wherein the pivot pin is snappable into the hinge channel to rotatably and removably couple the filter element to the lifter cover such that the filter element rotates freely between an open position and a closed position and is removable from the lifter cover by snapping the pivot pin out of the hinge channel.

14. The removable filter apparatus of claim 13, wherein the particulate capture chamber defines a hollow generally trapezoidal prism shaped chamber extending upwards from the midpoint of the rectangular base, the particulate capture chamber being open from below through the open bottom of the rectangular base.

15. The removable filter apparatus of claim 14, wherein the filtration surface defines two generally trapezoidal longitudinal walls of a generally consistent thickness along the longitudinal direction of the filter element, and two end caps at either end of the filtration surface that connect between the longitudinal walls to collectively define the open bottom.

16. The removable filter apparatus of claim 15, wherein the longitudinal walls of the particulate capture chamber define a narrowed portion with reduced width along the length of the particulate capture chamber to provide clearance for a latch defined by the lifter cover.

17. The removable filter apparatus of claim 13, wherein the particulate capture chamber defines a longitudinal wall having a teardrop shaped profile along the length of the rectangular base, the teardrop shaped profile defining a semicircular top tapering inwards to connect to the rectangular base of the filter element, the particulate capture chamber being open from below through the open bottom of the rectangular base.

18. The removable filter apparatus of claim 13, wherein the lifter cover further defines a series of stops onto which the filter element rests in the closed position to limit rotational movement of the filter element into the lifter cover, and a filter latch on a longitudinal wall of the lifter cover opposite the hinge channel to secure the filter element in the closed position.

19. A removable filter apparatus for a laundry treating appliance, comprising:

a lifter cover defining a generally trapezoidal prism shape with an open rectangular bottom, the lifter cover being slidably attachable along the open rectangular bottom to a lifter base of an inner circumferential surface of a drum of the laundry treating appliance, the lifter cover defining through openings to allow for free flow of water;

a filter element, selectively attachable to the lifter cover, the filter element sized to fit within the lifter cover to allow the filter element to capture particulate within the water flow, the filter element defining a rectangular base, and a filtration surface, integral to the rectangular base, defining a particulate capture chamber extending upwards from the rectangular base, the particulate capture chamber being centered along a midpoint of the rectangular base along the length of the filter element, the particulate capture chamber having an open bottom through the rectangular base, a hinge pivotally coupling the filter element to the lifter cover along a first longitudinal side of the rectangular base such that the filter element pivots between an open position and a closed position;

a filter latch defined by a longitudinal wall of the lifter cover opposite the first longitudinal side and securing the filter element in the closed position; and a finger relief recessed into the rectangular base on a second longitudinal side of the rectangular base opposite the first longitudinal side and adjacent the filter latch, the finger relief configured to be gripped to apply force to release the filter latch and pivot the filter element to the open position.

20. The removable filter apparatus of claim 19, wherein the hinge comprises a plurality of spaced-apart mounts projecting from the first longitudinal side of the rectangular base, a pivot pin bridging the spaced-apart mounts parallel to and spaced away from the rectangular base, and a hinge snap defined by the lifter cover comprising a hinge channel interrupted by a plurality of hinge breaks registering with the spaced-apart mounts, the pivot pin being resiliently snapped into and out of the hinge channel, and the finger relief defines a semicircular profile recessed into a peripheral edge of the rectangular base.

* * * * *